US009046961B2

(12) United States Patent
King et al.

(10) Patent No.: US 9,046,961 B2
(45) Date of Patent: Jun. 2, 2015

(54) ROBUST OPTICAL TOUCH—SCREEN SYSTEMS AND METHODS USING A PLANAR TRANSPARENT SHEET

(71) Applicants: Jeffrey Stapleton King, Menlo Park, CA (US); Dragan Pikula, Horseheads, NY (US); Richard Clayton Walker, Palo Alto, CA (US)

(72) Inventors: Jeffrey Stapleton King, Menlo Park, CA (US); Dragan Pikula, Horseheads, NY (US); Richard Clayton Walker, Palo Alto, CA (US)

(73) Assignee: CORNING INCORPORATED, Corning, NY (US)

( * ) Notice: Subject to any disclaimer, the term of this patent is extended or adjusted under 35 U.S.C. 154(b) by 196 days.

(21) Appl. No.: 13/686,571

(22) Filed: Nov. 27, 2012

(65) Prior Publication Data
US 2013/0135259 A1    May 30, 2013

Related U.S. Application Data

(60) Provisional application No. 61/564,024, filed on Nov. 28, 2011.

(51) Int. Cl.
*G06F 3/042* (2006.01)
(52) U.S. Cl.
CPC ............ *G06F 3/0421* (2013.01); *G06F 3/0428* (2013.01); *G06F 2203/04104* (2013.01); *G06F 2203/04109* (2013.01)
(58) Field of Classification Search
CPC ......................................... G06F 3/042–3/0428
USPC .................................................. 345/156–184
See application file for complete search history.

(56) References Cited

U.S. PATENT DOCUMENTS

| 4,254,333 A | 3/1981 | Bergstrom |
| 4,346,376 A | 8/1982 | Mallos |
| 4,484,179 A | 11/1984 | Kasday .......................... 340/365 |
| 4,511,760 A | 4/1985 | Garwin et al. .................. 178/18 |
| 4,542,375 A | 9/1985 | Alles et al. ..................... 340/712 |
| 4,673,918 A | 6/1987 | Adler et al. |

(Continued)

FOREIGN PATENT DOCUMENTS

| EP | 0901229 | 6/2007 |
| EP | 2392904 | 12/2011 |

(Continued)

OTHER PUBLICATIONS

Machine translation of JP2011-103094.
Machine translation of FR2963839.
Avinash C. Kak et al., "Principles of computerized tomographic imaging", IEEE Press, 1988—book.
Klaus Mueller, "Fast and Accurate Three-Dimensional Reconstruction From Cone-Beam Projection Data Using Algebraic Methods", Dissertation, Ph.D, The Ohio State University, 1998.

(Continued)

*Primary Examiner* — William Boddie
*Assistant Examiner* — Carolyn R Edwards
(74) *Attorney, Agent, or Firm* — Jason A. Barron

(57) ABSTRACT

An optical touch screen that utilizes a planar transparent sheet and that is configured to determine the position of a touch event on the transparent sheet is disclosed. Light-source elements and light-sensing elements are operably disposed at the transparent sheet perimeter. Light is detected over lines-of-sight between the light-source elements and the light-sensing elements. Attenuated lines-of-sight due to a touch event are determined. Polygons are established by overlapping triangles defined by the limiting lines of sight for each light-sensing element. Polygons with attenuations below the attenuation threshold are eliminated. The centers of the remaining polygons are then determined to establish the locations of the touch events. The systems and methods provide robust detection of multiple touch events.

20 Claims, 18 Drawing Sheets

(56) References Cited

U.S. PATENT DOCUMENTS

| | | | |
|---|---|---|---|
| 4,687,885 A | 8/1987 | Talmage, Jr. et al. | 178/18 |
| 4,703,316 A | 10/1987 | Sherbeck | |
| 4,725,978 A | 2/1988 | Fujioka | 364/900 |
| 5,222,400 A | 6/1993 | Hilton | 73/862.043 |
| 5,446,480 A | 8/1995 | Yoshida | 345/157 |
| 5,610,629 A | 3/1997 | Baur | 345/104 |
| 5,764,223 A | 6/1998 | Chang et al. | |
| 6,031,520 A | 2/2000 | De Gotari | 345/157 |
| 6,084,571 A | 7/2000 | De Gotari | 345/157 |
| 6,326,948 B1 | 12/2001 | Kobachi et al. | 345/157 |
| 6,504,530 B1 | 1/2003 | Wilson et al. | 345/173 |
| 6,556,149 B1 | 4/2003 | Reimer et al. | 341/20 |
| 6,788,295 B1 | 9/2004 | Inkster | 345/175 |
| 6,804,012 B2 | 10/2004 | Gombert | 356/614 |
| 6,816,537 B2 | 11/2004 | Liess | 372/109 |
| 6,900,795 B1 | 5/2005 | Knight, III et al. | 345/173 |
| 6,927,384 B2 | 8/2005 | Reime et al. | |
| 7,042,444 B2 | 5/2006 | Cok | |
| 7,098,592 B2 | 8/2006 | Nishikawa | |
| 7,157,649 B2 | 1/2007 | Hill | 178/18.04 |
| 7,158,054 B2 | 1/2007 | Pihlaja | 341/22 |
| 7,298,367 B2 | 11/2007 | Geaghan et al. | |
| 7,417,627 B2 | 8/2008 | Cok | 345/173 |
| 7,432,893 B2 | 10/2008 | Ma et al. | |
| 7,442,914 B2 | 10/2008 | Eliasson et al. | |
| 7,465,914 B2 | 12/2008 | Eliasson et al. | |
| 7,515,140 B2 | 4/2009 | Philipp | 345/173 |
| 7,685,538 B2 | 3/2010 | Fleck et al. | 715/863 |
| 7,705,835 B2 | 4/2010 | Eikman | |
| 7,786,978 B2 | 8/2010 | Lapstun et al. | 345/166 |
| 7,855,716 B2 | 12/2010 | McCreary et al. | |
| 7,903,090 B2 | 3/2011 | Soss et al. | 345/173 |
| 7,920,124 B2 | 4/2011 | Tokita et al. | 345/156 |
| 8,049,739 B2 | 11/2011 | Wu et al. | 345/175 |
| 8,075,999 B2 | 12/2011 | Barefoot et al. | |
| 8,130,210 B2 | 3/2012 | Saxena et al. | 345/175 |
| 8,179,375 B2 | 5/2012 | Ciesla et al. | 345/173 |
| 8,187,987 B2 | 5/2012 | Amin et al. | |
| 8,253,712 B2 | 8/2012 | Klinghult | 345/174 |
| 8,325,158 B2 | 12/2012 | Yatsuda et al. | 345/176 |
| 8,368,677 B2 | 2/2013 | Yamamoto | 345/207 |
| 8,378,975 B2 | 2/2013 | Yoon et al. | 345/173 |
| 8,390,481 B2 | 3/2013 | Pance et al. | 341/33 |
| 8,395,601 B2 | 3/2013 | Nho et al. | 345/176 |
| 8,411,068 B2 | 4/2013 | Lu et al. | 345/175 |
| 8,553,014 B2 | 10/2013 | Holmgren et al. | 345/176 |
| 2001/0007449 A1 | 7/2001 | Kobachi et al. | 345/156 |
| 2002/0175900 A1 | 11/2002 | Armstrong | |
| 2003/0026971 A1 | 2/2003 | Inkster et al. | 428/304.4 |
| 2004/0252091 A1* | 12/2004 | Ma et al. | 345/87 |
| 2005/0191062 A1 | 9/2005 | Rafferty et al. | |
| 2005/0248540 A1 | 11/2005 | Newton | |
| 2006/0096392 A1 | 5/2006 | Inkster et al. | 73/862.041 |
| 2006/0158437 A1 | 7/2006 | Blythe et al. | |
| 2006/0227085 A1* | 10/2006 | Boldt et al. | 345/83 |
| 2006/0279558 A1 | 12/2006 | Van Delden et al. | |
| 2008/0068343 A1 | 3/2008 | Hoshino et al. | 345/173 |
| 2008/0088597 A1 | 4/2008 | Prest et al. | 345/173 |
| 2008/0088600 A1 | 4/2008 | Prest et al. | 345/173 |
| 2008/0158175 A1* | 7/2008 | Hotelling et al. | 345/173 |
| 2008/0284742 A1 | 11/2008 | Prest et al. | 345/173 |
| 2008/0284925 A1 | 11/2008 | Han | |
| 2008/0286548 A1 | 11/2008 | Ellison et al. | |
| 2008/0289884 A1 | 11/2008 | Elwell | 178/18.01 |
| 2008/0303797 A1 | 12/2008 | Grothe | 345/173 |
| 2009/0002347 A1* | 1/2009 | Ming et al. | 345/182 |
| 2009/0015564 A1 | 1/2009 | Ye et al. | 345/173 |
| 2009/0073142 A1 | 3/2009 | Yamashita et al. | |
| 2009/0153519 A1 | 6/2009 | Suarez Rovere | |
| 2009/0189878 A1 | 7/2009 | Goertz et al. | |
| 2009/0215607 A1 | 8/2009 | Dejneka et al. | |
| 2009/0219253 A1 | 9/2009 | Izadi et al. | 345/173 |
| 2009/0219261 A1 | 9/2009 | Jacobson et al. | 345/175 |
| 2010/0001978 A1 | 1/2010 | Lynch et al. | 345/175 |
| 2010/0060548 A1 | 3/2010 | Choi et al. | 345/1.3 |
| 2010/0079407 A1 | 4/2010 | Suggs | |
| 2010/0085329 A1 | 4/2010 | Tseng et al. | |
| 2010/0090969 A1 | 4/2010 | Zhao et al. | |
| 2010/0103123 A1 | 4/2010 | Cohen et al. | 345/173 |
| 2010/0103140 A1 | 4/2010 | Hansson | 345/175 |
| 2010/0117974 A1 | 5/2010 | Joguet et al. | 345/173 |
| 2010/0117989 A1 | 5/2010 | Chang | 345/175 |
| 2010/0156847 A1 | 6/2010 | No et al. | 345/175 |
| 2010/0182168 A1 | 7/2010 | Van De Wijdeven et al. | |
| 2010/0207906 A1 | 8/2010 | Anglin et al. | 345/174 |
| 2010/0245288 A1 | 9/2010 | Harris | 345/175 |
| 2010/0253650 A1 | 10/2010 | Dietzel et al. | 345/175 |
| 2010/0295821 A1 | 11/2010 | Chang et al. | |
| 2010/0302209 A1 | 12/2010 | Large | |
| 2010/0321310 A1 | 12/2010 | Kim et al. | 345/173 |
| 2011/0141053 A1 | 6/2011 | Bulea et al. | 345/174 |
| 2011/0148819 A1 | 6/2011 | Yu | |
| 2011/0157092 A1 | 6/2011 | Yang | 345/175 |
| 2011/0163997 A1 | 7/2011 | Kim | |
| 2011/0199340 A1 | 8/2011 | Aikio et al. | |
| 2011/0221997 A1 | 9/2011 | Kim et al. | |
| 2011/0227874 A1 | 9/2011 | Fahraeus et al. | |
| 2011/0234537 A1 | 9/2011 | Kim | |
| 2011/0298742 A1 | 12/2011 | Dingnan | 345/173 |
| 2012/0038593 A1 | 2/2012 | Ronka et al. | |
| 2012/0068939 A1 | 3/2012 | Pemberton-Pigott | 345/173 |
| 2012/0068970 A1 | 3/2012 | Pemberton-Pigott | 345/175 |
| 2012/0068971 A1 | 3/2012 | Pemberton-Pigott | 345/175 |
| 2012/0071206 A1 | 3/2012 | Pemberton-Pigott | 455/566 |
| 2012/0092250 A1 | 4/2012 | Hadas et al. | 345/156 |
| 2012/0176345 A1 | 7/2012 | Ye et al. | 345/175 |
| 2012/0212441 A1* | 8/2012 | Christiansson et al. | 345/173 |
| 2012/0212451 A1 | 8/2012 | Large et al. | 345/175 |
| 2012/0242607 A1 | 9/2012 | Ciesla et al. | 345/173 |
| 2012/0326981 A1 | 12/2012 | Kurose | 345/160 |
| 2013/0107306 A1 | 5/2013 | Yoon et al. | 358/1.13 |
| 2013/0135254 A1 | 5/2013 | Lee et al. | 345/175 |

FOREIGN PATENT DOCUMENTS

| | | |
|---|---|---|
| EP | 2437144 | 4/2012 |
| EP | 2437145 | 4/2012 |
| EP | 2439620 | 4/2012 |
| EP | 2439619 | 5/2012 |
| FR | 2963839 | 8/2010 |
| GB | 2313195 | 11/1997 |
| JP | 2011103094 | 5/2011 |
| WO | 02/35460 | 5/2002 |
| WO | 2010/063320 | 6/2010 |
| WO | 2011028169 A1 | 3/2011 |
| WO | 2011028170 A1 | 3/2011 |
| WO | 2011/049511 | 4/2011 |
| WO | 2011049513 A1 | 4/2011 |
| WO | 2011078769 A1 | 6/2011 |
| WO | 2011095638 A3 | 8/2011 |
| WO | 2012/027599 | 3/2012 |
| WO | 2012/087286 | 6/2012 |
| WO | 2013/029641 | 3/2013 |
| WO | 2013/037385 | 3/2013 |
| WO | 2013/068651 | 5/2013 |

OTHER PUBLICATIONS

Koeppe et al.; "Hit the Spot 2d light point localisation in flexible and stretchable planar waveguides"; Johannes Kepler University Linz; Soft Matter Physics Group; MRS Spring Meeting (2009); pp. 1-18.
Sumriddetchkajorn et al.; "Ultra-High Contrast Low-Leadage-Light Optical Touch Device Structures Using Light Scattering and Total Internal Reflection Concepts"; Sensors and Actuators A, 126 (2006) 68-72.
G. Kodl.; "A New Optical Waveguide Pressure Sensor Using Evanescent Field"; Electronic Components and Technology Conference. Proceedings. 54th (Jun. 4, 2004); pp. 1943-1946.
http://dl.dropbox.com/u/56644/MRS_RobertKoeppe.ppt.

* cited by examiner

ROBUST OPTICAL TOUCH—SCREEN SYSTEMS AND METHODS USING A PLANAR TRANSPARENT SHEET

This application claims the benefit of priority under 35 USC §119 of U.S. Provisional Application Ser. No. 61/564,024 filed Nov. 28, 2011 the content of which is relied upon and incorporated herein by reference in its entirety.

FIELD

The present disclosure relates to optical touch screens, and in particular to robust optical touch screen systems and methods that use a planar transparent sheet and that can detect multiple touch events.

BACKGROUND ART

The market for displays having touch-screen functionality is rapidly growing. As a result, a variety of sensing techniques have been developed to enable displays to have touch-screen functionality. However, the existing techniques each have some type of performance disadvantage for specific applications that results in significant added cost to the manufacturing of the display.

Touch-screen functionality is gaining wider use in mobile device applications, such as smart phones, e-book readers, laptop computers and tablet computers. In addition, larger displays, such as for desktop computers and wall-mounted screens, are getting even larger. This increase in display size is accompanied by an increase in the display cost when using a conventional touch-screen technology, such as projected capacitive touch (PCAP) technology.

Consequently, there is a need to minimize the overall thickness and weight of touch-screens for the wide range of applications, from the smallest hand-held devices to the largest displays. Moreover, there is also a need for touch-screens to have more robust functionality, such as improved touch position accuracy, fingerprint immunity and multi-touch capability.

SUMMARY

An aspect of the disclosure is a method of establishing positions of touch events on a transparent sheet having a perimeter, with light-source elements and light-sensing elements operably disposed adjacent the perimeter. The method includes using the light-sensing elements to measure intensity values of light from the light-source elements, wherein the light travels internally within the transparent sheet over lines-of-sight between the light-source elements and the light-sensing elements. The method also includes determining limiting lines-of-sight for each light-sensing element based on the intensity values as compared to an attenuation threshold. The method also includes overlapping triangles defined by the limiting lines-of-sight for each light-sensing element to establish one or more polygons. The method additionally includes determining centers of the one or more polygons to establish the touch event positions.

In some embodiments, each polygon has an associated attenuation based on the measured intensity values, and further comprising: eliminating any polygons whose associated attenuation is below the attenuation threshold. In some embodiments, the method further comprises determining the intensity of the touch event based on a comparison of the detector signal strength to a signal threshold. In some embodiments, the transparent sheet is substantially transparent to infrared (IR) light, and wherein the light from the light-source elements comprises an IR wavelength. In other embodiments, the IR light with a band-pass filter disposed adjacent the light-sensing elements, the band-pass filter configured to be substantially opaque to visible light and IR light having an IR wavelength different from the IR light emitted by the light-source elements. In some embodiments, the perimeter includes a plurality of corners, and including arranging the light-sensing elements one adjacent each of the plurality of corners.

In some embodiments, the method further comprises generating from the light-sensing elements respective detector signals representative of the intensity values as detected by the light-sensing elements; and processing the detector signals to determine the limiting lines-of-sight. In other embodiments, generating the detector signal includes: making a first photocurrent measurement with one of the light-sensing elements when the light-source elements are turned off; making a second photocurrent measurement with the same one of the light-sensing elements when the light-source elements are turned on; and subtracting the first photocurrent from the second photocurrent.

In some embodiments, generating the detector signal includes processing the detector signal with an electrical circuit having an amplifier, and wherein the method further includes: making integrated photocurrent measurements for a fixed total time $\Delta T$; breaking the fixed total time $\Delta T$ into N intervals to define N sub-measurements that have corresponding time intervals $\Delta T/N$; adding together the N sub-measurements to simulate a single integration; and dynamically choosing N to avoid overloading the amplifier.

In some embodiments, there are n light-sensing elements, and further comprising: determining a first set of the triangles for a first one of the light-sensing elements; determining a second set of the triangles for a second one of the light-sensing elements; determining a first set of the polygons from the first and second sets of triangles; determining a third set of the triangles for a third one of the light-sensing elements and establishing intersections of the third set of triangles with the first set of polygons to form a second set of the polygons; and repeating the previous step up until the $n^{th}$ light-sensing element to arrive at a final set of polygons used in act d) to establish the touch event positions. In some embodiments, determining the centers of one or more polygons comprises for each polygon: determining attenuation values within the polygon; and calculating a center-of-mass of the polygon based on the attenuation values within the polygon and identifying the center-of-mass as the polygon center.

In some embodiments, determining the centers of one or more polygons comprises for each polygon: assuming a constant value for the attenuation within the polygon; and calculating the geometric center of the polygon as the polygon center. In some embodiments, the measured intensity values are converted to detector signal strengths by the light-sensing elements, and further comprising: establishing a baseline measurement of light traveling over the lines-of-sight; defining a threshold detector signal strength based on the baseline measurement; and comparing the detector signal strengths associated with the attenuated lines-of-sight to the threshold signal strength to determine whether the touch event occurred. In other embodiments, the method further comprises adjusting the baseline measurement based on changes in the detector signal strength; and adjusting the threshold signal strength based on the adjusted baseline measurement.

Another aspect of the disclosure is a touch-screen system for sensing a location of one or more touch events. The system has a transparent sheet with a perimeter and a top surface where the one or more touch events occur. The system also has a plurality of light-source elements that emit light and that are operably disposed adjacent the perimeter to couple the light into the transparent sheet to travel therein via total internal reflection. The system further includes a plurality of light-sensing elements operably disposed adjacent the perimeter to detect the light from the light-sensing elements and in response thereto generate detector signals having a signal strength representative of a detected light intensity. The one or more touch events cause attenuation of the light intensity along at least one of the lines-of-sight corresponding to the select light-sensing element. The system also includes a controller operably coupled to the light-source elements and the light-sensing elements. The controller is configured to control the emission of the light from the light-source elements and process the detector signals to 1) compare the detector signal strength in each light-sensing element to an attenuation threshold to establish a one or more triangles as defined by limiting ones of the attenuated lines-of-sight for the given light-sensing element, 2) establish locations of at least one polygon formed by at least one intersection of the one or more triangles, and 3) calculate a center of the at least one polygon to define locations of corresponding one or more touch events.

It is to be understood that both the foregoing general description and the following Detailed Description represent embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure and together with the description serve to explain the principles and operations of the disclosure.

In some embodiments, the controller is further configured to determine the intensity of the touch event based on a comparison of the detector signal strength to a signal threshold. In some embodiments, the transparent sheet is substantially transparent to infrared (IR) light, wherein the emitted light from the light sources comprises IR light, and wherein the light-sensing elements are configured to detect the IR light. In some embodiments, the perimeter includes a plurality of corners, and wherein the light-sensing elements are disposed one adjacent each of the plurality of corners. In some embodiments, the system further comprises band-pass filters disposed one adjacent each of the light-sensing elements, the band-pass filters each configured to be substantially opaque to visible light and IR light having an IR wavelength different from the IR light emitted by the light-source elements. In some embodiments, the system further comprises an electrical circuit operably coupled to one of the light-sensing elements, the electrical circuit being configured to provide a compensating current that reduces or eliminates an interfering current that arises due to interfering illumination. In some embodiments, the electrical circuit includes a digital-to-analog converter operably connected to a processor that provides a feedback control signal thereto to vary the compensating current.

Additional features and advantages of the disclosure are set forth in the detailed description that follows, and in part will be readily apparent to those skilled in the art from that description or recognized by practicing the disclosure as described herein, including the detailed description that follows, the claims, and the appended drawings. The claims are incorporated into and constitute part of the Detailed Description set forth below.

Additional features and advantages of the disclosure are set forth in the Detailed Description that follows and will be apparent to those skilled in the art from the description or recognized by practicing the disclosure as described herein, together with the claims and appended drawings.

Cartesian coordinates are shown in certain of the Figures for the sake of reference and are not intended as limiting with respect to direction or orientation.

DETAILED DESCRIPTION

Figure 1:
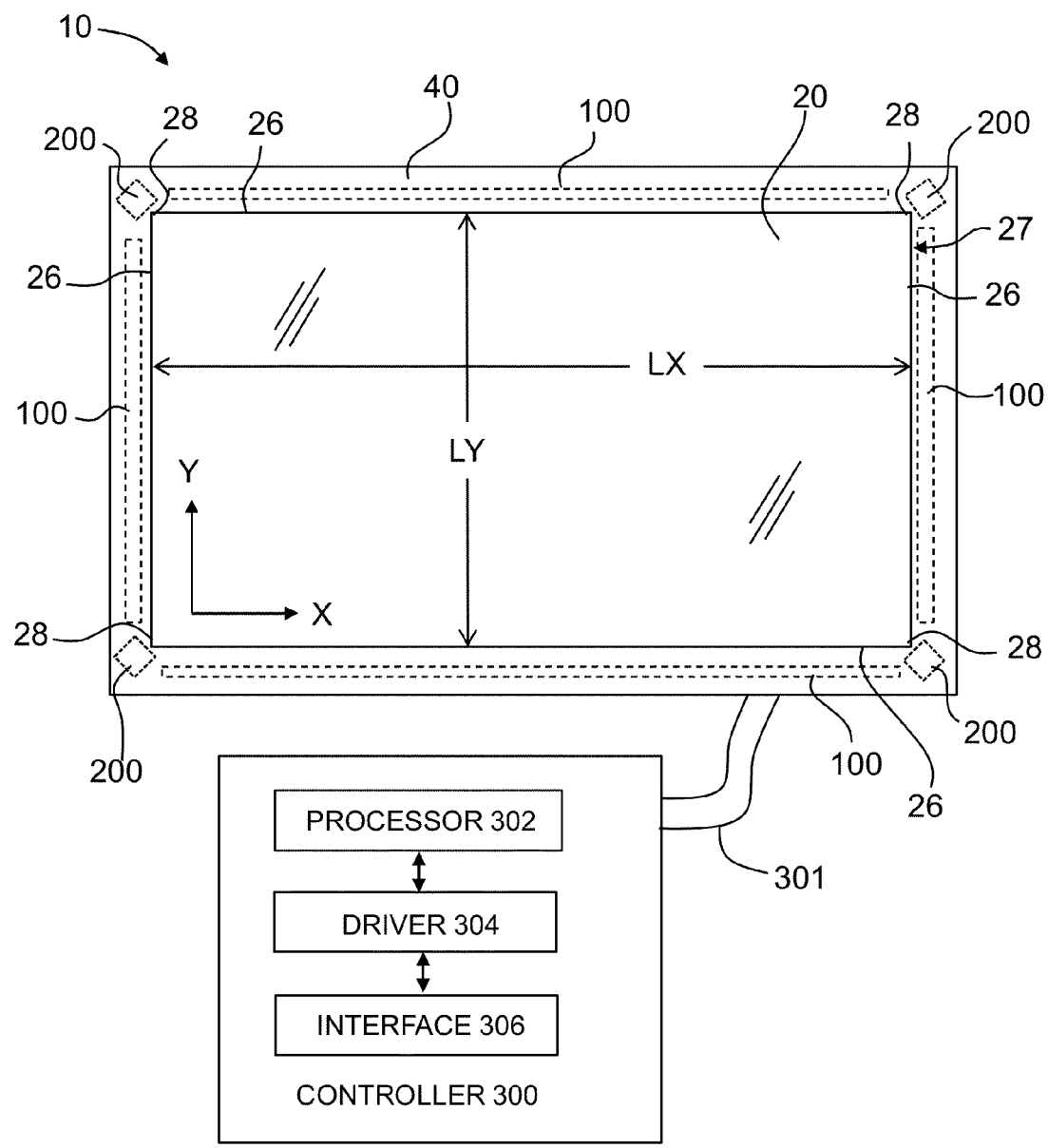
FIG. 1 is a face-on view of an example touch-screen system according to the disclosure.

FIG. 1 is a schematic diagram of an example touch-screen system 10 according to the disclosure. The touch-screen system 10 may be used in a variety of consumer electronic articles, for example, in conjunction with displays for cellphones and other electronic devices capable of wireless communication, music players, notebook computers, mobile devices, game controllers, computer "mice," electronic book readers and the like.

The touch-screen system 10 includes a transparent sheet 20, with light sources 100 and light-sensing elements 200 disposed adjacent the transparent sheet perimeter as discussed below. An optional bezel 40 serves to cover light sources 100 and light-sensing elements 200 so that they cannot be seen from above by a viewer. The term "bezel" is used broadly herein to mean any light-blocking member, film, component, etc., that serves to block at least visible light and that is configured to keep some portion of touch-screen system 10 from being viewed by a user 500 (see FIG. 14B). Thus, the term "bezel" as used herein is not limited to being a member located at the edge of the transparent sheet like a conventional mechanical bezel used for wristwatches, etc.

The touch-screen system 10 includes a controller 300 that is operably connected to light sources 100 and light-sensing elements 200 (e.g., via a bus 301) and configured to control the operation of touch-screen system 10. The controller 300 includes a processor 302, a device driver 304 and interface circuit 306, as described in greater detail below. In an example, light-sensing elements 200 comprise photodiodes.

Figure 2:
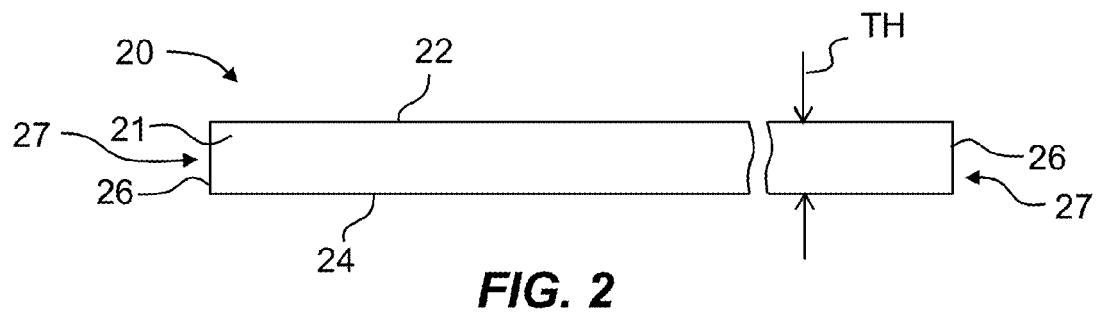
FIG. 2 is a cross-sectional view of the transparent sheet of the touch-screen system.
Figure 3:
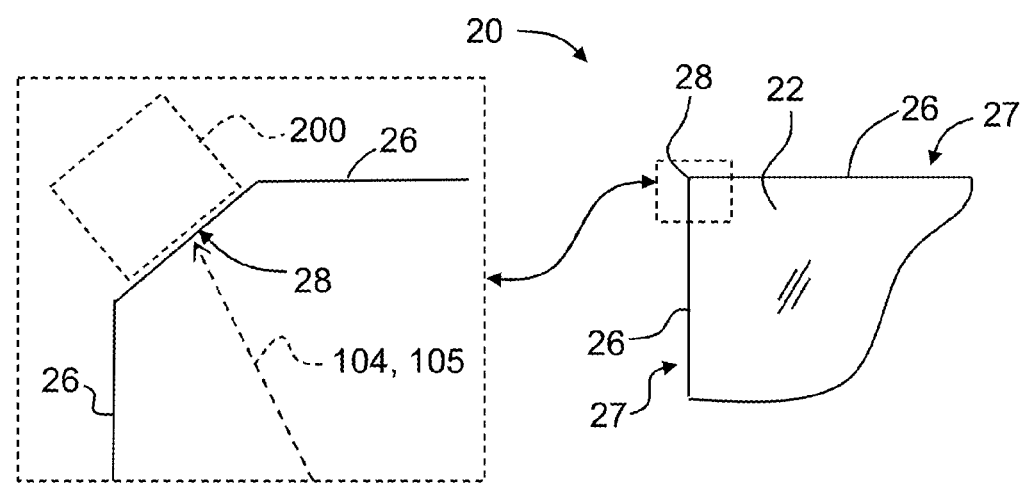
FIG. 3 is a close-up, top-down view of a corner of the transparent sheet, and includes a close-up inset illustrating an example where the corner is beveled and wherein a light-sensing element (shown in phantom) is disposed adjacent the beveled corner.

FIG. 2 is a cross-sectional view of transparent sheet 20, and FIG. 3 is a close-up, top-down view of the corner of the transparent sheet. The transparent sheet 20 includes a bulk portion or body 21, a top surface 22, a bottom surface 24 and at least one edge 26 that defines a perimeter 27 An example transparent sheet 20 is generally rectangular and includes four edges 26 that define four corners 28, and this example of the transparent sheet is used in the discussion below by way of illustration. Other shapes for transparent sheet 20 may be used, such a circular.

The close-up inset in FIG. 3 illustrates an example embodiment where one of the corners 28 is beveled, and shows in phantom one of the light-sensing elements 200 operably disposed adjacent the beveled corner. Also shown in phantom in the close-up inset is light 104 traveling over a line-of-sight 105, as described below.

The transparent sheet 20 has a thickness TH, which is substantially uniform (i.e., top and bottom surfaces 22 and 24 are substantially parallel). In an example, transparent sheet 20 is rectangular and has a dimension (length) LX in the X-direction and a length LY in the Y-direction, and so has four corners 28 defined by four edges 26. Generally, transparent sheet 20 can have a shape wherein edges 26 define multiple corners 28 (e.g., six corners for a hexagonal shape).

The transparent sheet 20 may generally be made of any suitably transparent material that can be formed into a thin planar sheet, such as plastic, acrylic, glass, etc., and that supports the transmission of light within its body 21 without substantial loss due to scattering or absorption. In an embodiment, transparent sheet 20 may be a chemically strengthened glass, such as a soda-lime-type glass. An example glass for transparent sheet 20 is an alkali aluminosilicate glass hardened through ion exchange. These types of glass can comprise $Na_2O$ (soda), CaO (lime) and $SiO_2$ (silica), but can also include oxides such as MgO, $Li_2O$, $K_2O$, ZnO, and $ZrO_2$. Once hardened through ion exchange, these types of glass exhibit certain characteristics that make them desirable for touch screen applications, as well as other applications (e.g., as a cover glass). Further details as to the formulation or production, or both, of soda-lime-type glass suitable for use as transparent sheet 20 may be found in one or more of U.S. patent application Ser. No. 11/888,213 filed Jul. 31, 2007; U.S. patent application Ser. No. 12/537,393 filed Aug. 7, 2009; U.S. patent application Ser. No. 12/545,475 filed Aug. 21, 2009; and U.S. patent application Ser. No. 12/392,577 filed Feb. 25, 2009, which patent applications are incorporated by reference herein. An exemplary glass for transparent sheet 20 is Gorilla® glass, from Corning, Inc., Corning, N.Y. Also, an exemplary glass, such as low-iron Gorilla® glass or other low-iron ion-exchanged glass, is transparent to IR-wavelength light 104.

Figure 4:
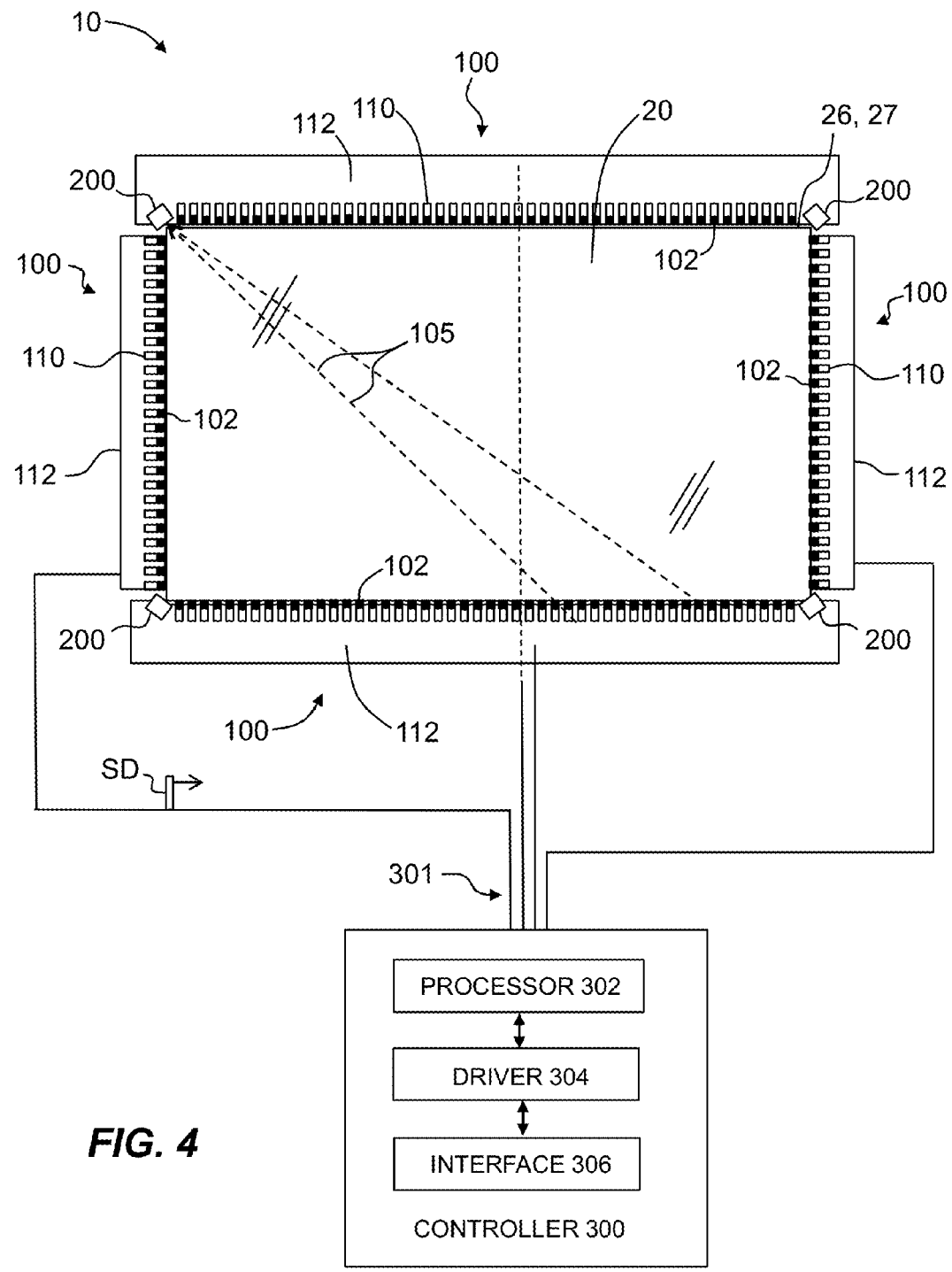
FIG. 4 is a more detailed face-on view of the example touch-screen system of FIG. 1, and shows example lines-of-sight associated with one of the light-sensing elements.

FIG. 4 is a schematic diagram of a touch-screen system 10 that is similar to that of FIG. 1 but that shows more details of the system and omits bezel 40 for ease of illustration. The light sources 100 are actually light source arrays that include light-source elements 102 shown operably disposed adjacent perimeter 27 of transparent sheet 20. An example light-source element 102 is a light-emitting diode (LED). Also in an embodiment, light-source elements 102 each emit light 104 at an IR wavelength, such as between 850 nm and 950 nm. In the discussion below, light 104 is also referred to as "light ray" 104 or "light rays" or "light beam" 104 or "light beams" 104 where appropriate.

FIG. 4 shows example lines-of-sight 105 between one of the light-source elements 102 and the corresponding example light-sensing elements 200. Note that in the example of a rectangular transparent sheet 20, each light-source element 102 has lines-of-sight 105 with the two light-sensing elements 200 on corners 28 of the opposite edge 26. Thus, for the rectangular configuration of transparent sheet 20, light 104 from each light-source element 102 is incident upon two light-sensing elements 200 along respective lines-of-sight 105.

In an example, light-source elements 102 are operably mounted on flex-circuit boards ("flex circuits") 110, which in turn are mounted to printed circuit boards (PCB) 112 associated with each edge 26 of transparent sheet 20. In an embodiment, light-source elements 102 are edge-coupled to transparent sheet 20 at edges 26, as discussed in greater detail below. Flex circuits 110 and PCBs 112 are shown in FIG. 4 as being oriented in a plane parallel to transparent sheet 20 by way of example. The flex circuits 110 and PCBs 112 can also be oriented in a plane perpendicular to transparent sheet 20.

In the general operation of touch-screen system 10, processor 302 drives the sequential activation of light-source elements 102 and also controls the detection of light 104 at light-sensing elements 200 for each light-source activation. The light-sensing elements 200 generate an electrical detector signal SD in response to detecting light 104, wherein the strength of the detector signal is representative of the intensity of the detected light for the particular line-of-sight 105 over which the light travels. Thus, each line-of-sight 105 can be considered as an optical path that has associated therewith a certain light intensity. Portions of the interface circuit 306 can be placed near the light-sensing elements 200. For example, preamplifiers and analog-to-digital converters may be placed near light-sensing elements 200 to eliminate noise that may be induced in long wires between processor 302 and the light-sensing elements 200, particularly when the processor is centrally located.

In an example, processor 302 controls the light emission and detection process to optimize the detection of light 104, e.g., by providing a characteristic (e.g., a modulation) to the light 104 from the light-source elements 102, or by gating light-sensing elements 200 to reduce noise, etc., or both.

Figure 5:
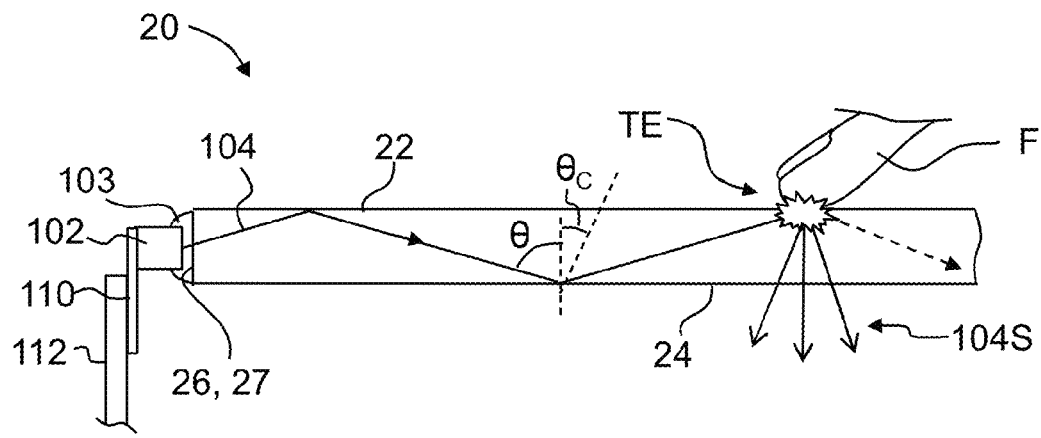
FIG. 5 is a close-up cross-sectional view of the transparent sheet at an edge 26, showing an example of how a light-source element is edge-coupled to the transparent sheet.

FIG. 5 is a close-up cross-sectional view of transparent sheet 20 at one of the edges 26, showing an example of how a light-source element 102 is optically coupled to the transparent sheet. In the example of FIG. 5, light-source element 102 is edge-coupled to edge 26 of transparent sheet 20 using, for example, a glue or adhesive 103. Note also that FIG. 5 illustrates an example embodiment wherein flex circuit 110 and PCB 112 are arranged perpendicular to the plane of transparent sheet 20. In an example, glue or adhesive 103 is index matched to the refractive index of transparent sheet 20.

When a given light-source element 102 is activated, it emits light 104 (light rays) that travels into body 21 of transparent sheet 20. The portion of light 104 that has an angle beyond a critical internal reflection angle $\theta_C$ (see FIG. 5) of transparent sheet 20 remains trapped in transparent sheet body 21 via total internal reflection and travels therein. If the travel of internally reflected light 104 remains uninterrupted, it will travel over the length of its line-of-sight 105 and arrive at the corresponding light-sensing element 200. The light-sensing elements 200 are configured to convert the detected light 104 in the aforementioned electrical detector signal SD, which in an example is a photocurrent. The electrical detector signal SD is then sent to processor 302 for processing, as described below. Thus, transparent sheet 20 acts as an optical waveguide that supports a larger number of guided modes, i.e., light rays 104 that travel within the transparent sheet over a wide range of an internal reflection angle $\theta$ beyond critical internal reflection angle $\theta_C$.

Figure 6A:
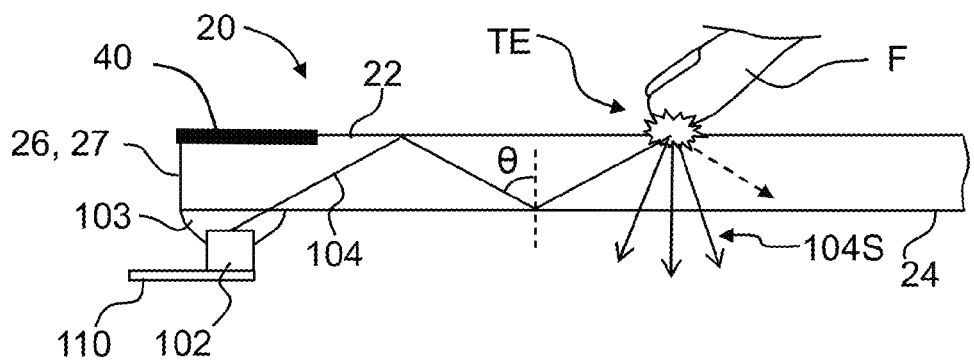
FIG. 6A is similar to FIG. 5 and shows an example where the light-source element is face-coupled to the transparent sheet at the bottom surface, and also shows a bezel disposed on the top surface to block the light-source element from view from above.

FIG. 6A is similar to FIG. 5 and illustrates an alternative embodiment wherein light-source element 102 is disposed adjacent bottom surface 24 of transparent sheet 20 and is optically coupled thereto. This face-coupling configuration offers several advantages over the edge-coupling configuration, including simpler manufacturing, no bezel requirement, and increased touch sensitivity. When light 104 is launched into transparent sheet 20, multiple modes propagate at different bounce angles as discussed above in connection with the edge-coupling configuration. The edge-coupling configuration is more likely to generate modes at low bounce angles, while the surface-coupling configuration generates modes at higher bounce angles. Light rays 104 with higher bounce angles provide increased touch sensitivity because they strike top surface 22 more frequently, thereby providing a greater opportunity to interact with a touch event TE.

To keep light-source elements 102 from being seen through transparent sheet 20 by user 500, bezel 40 can be employed. In an example, bezel 40 is in the form of a film that is opaque at least at visible wavelengths and that optionally transmits at IR wavelengths. An example film for bezel 40 comprises a black paint that absorbs light over a wide range of wavelengths including the visible and IR wavelengths. In another example illustrated in FIG. 6B, bezel 40 can be disposed between light-source element 102 and bottom surface 24 of transparent sheet 20, in which case the bezel needs to be substantially transparent to the wavelength of the light-emitting element. In this case, a convenient wavelength of light 104 is an IR wavelength.

Modeling indicates that about 28% of light 104 outputted by light-source element 102 can be trapped within transparent sheet 20 using the face-coupling configuration of FIG. 6, as compared to about 80% for the edge-coupling configuration of FIG. 5.

Figure 6B:
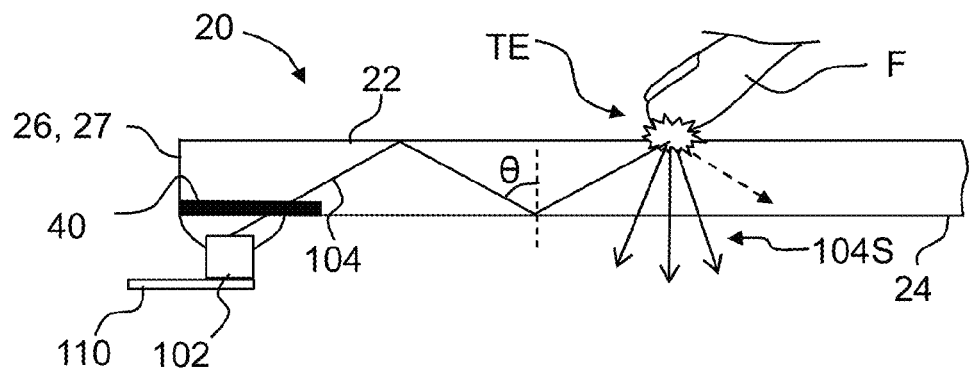
FIG. 6B is similar to FIG. 6A and shows an example where the bezel is transparent to infrared (IR) radiation but opaque to visible radiation, with the bezel disposed between the light-source element and the bottom of the transparent sheet.

With continuing reference to FIG. 5 and FIGS. 6A and 6B, when a touch event TE occurs, such as when a person's finger F touches top surface 22 of transparent sheet 20, it changes the total internal reflection condition. This causes light 104 to be scattered out of transparent sheet body 21 as scattered light 104S at the point (or more accurately, over the small area) where top surface 22 is touched, thereby attenuating light beam 104. The reduction in the intensity of light 104 arriving at the corresponding light-sensing elements 200 for the corresponding lines-of-sight 105 gives rise to a diminished signal strength (e.g., a reduced photocurrent) for electrical detector signal SD (as compared to, say, a baseline photocurrent measurement), and indicates that a touch event TE has occurred. A threshold value T for the measured electrical detector signal SD can be used to determine whether a touch event TE has occurred, as discussed in greater detail below.

Figure 7:
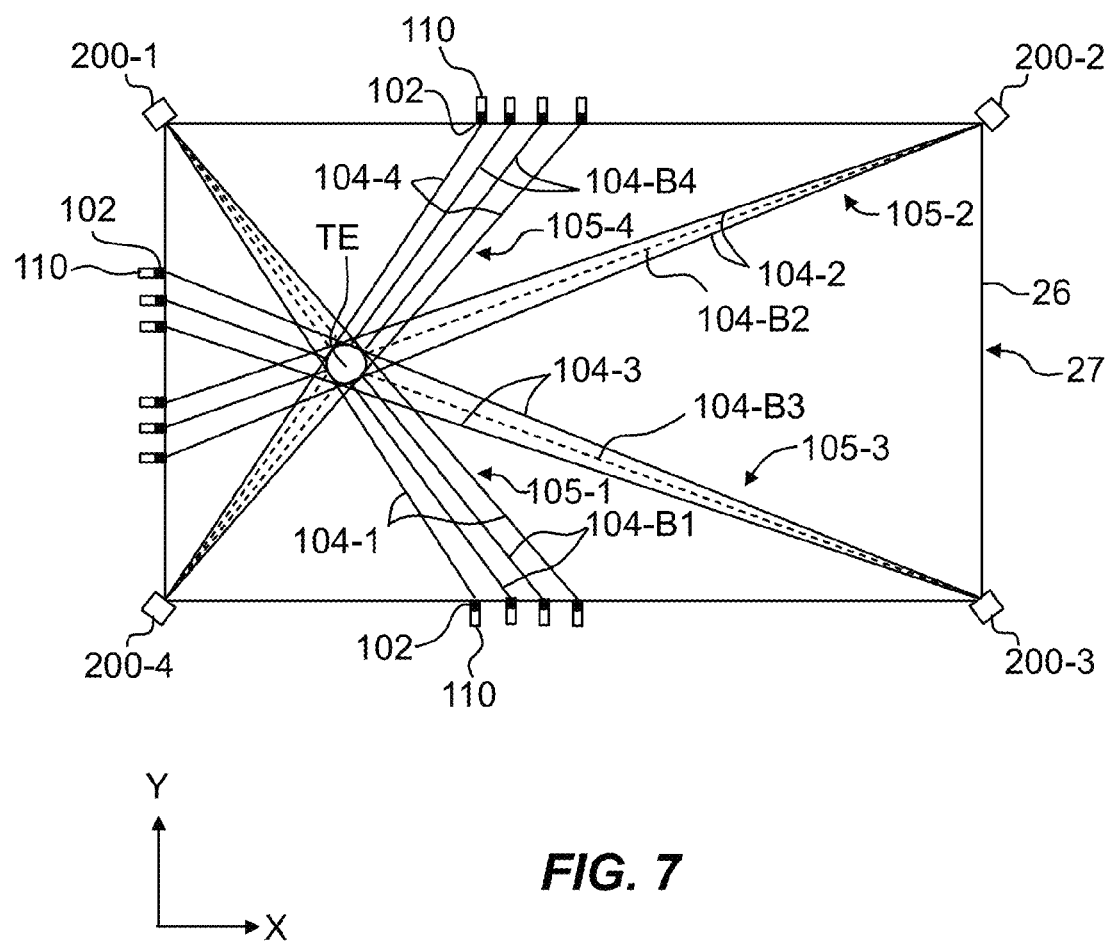
FIG. 7 is a face-on view of the transparent sheet, the light source elements and light-sensing elements of the touch screen system, illustrating a step in the method of determining the position of a touch event by measuring the attenuation (blocking) of fans of light rays as measured by the light-sensing elements.

FIG. 7 is a face-on view of transparent sheet 20, light-source elements 102 and light-sensing elements 200, illustrating how the occurrence and location of a touch event TE are determined. As discussed above, light 104 from a given light-source element 102 has a line-of-sight 105 to the light-sensing elements 200 located opposite the light-source element (i.e., not associated with the corners 28 of the same edge 26). FIG. 7 shows the limiting light beams 104-1, 104-2, 104-3 and 104-4 and the corresponding attenuated or "broken" light beams 104-B1, 104B2, 104B3 and 104-B4 that define respective lines-of-sight 105-1, 105-2, 105-3 and 105-4 for light-sensing elements 200-1, 200-2, 200-3 and 200-4 based on an example touch event TE. An accurate position of touch event TE is determined using the algorithm described below.

The position resolution of touch event TE is determined by the density of light-source elements 102 at the edges 26 of transparent sheet 20, which in turn defines the density of the lines-of-sight 105. Consider an example configuration of touch-screen system 10 where transparent sheet 20 has length LX=432 mm and length LY=254 mm, with 252 light-source elements 102 distributed about edges 26, with 80 of the light-source elements along the long edges and 46 of the light-source elements along the short edges. For a touch event TE having a circular size of 10 mm in diameter (which is about the size of a finger touch), a pitch for light-source elements 102 of 5.25 mm ensures that the touch event TE would break at least one light beam 104, i.e., would intercept at least one line-of-sight 105.

The controller 300 is configured to provide the functionality necessary to activate light-source elements 102 so that they emit light 104 in a select manner. The controller 300 is also configured to receive and process electrical detector signals SD from light-sensing elements 200 to determine the one or more positions on top surface 22 of transparent sheet 20 at which a touch event TE occurs.

In particular, with reference again to FIG. 4, controller 300 includes the aforementioned processor 302 (e.g., a microprocessor), the aforementioned device driver (driver circuit) 304, and the aforementioned interface circuit 306. The processor 302 is coupled to driver circuit 304 and interface circuit 306 via signal lines, buses, or the like. The processor 302 is configured to execute computer readable code (software programs) that controls and orchestrates the activities of driver circuit 304 and interface circuit 306 to achieve the aforementioned functions and operations and to carry out various calculations for the methods described herein. For example, processor 302 may provide control signals (not shown) to driver circuit 304 indicating when to activate and de-activate (i.e., turn on and turn off) the respective light-source elements 102 as well as light-sensing elements 200.

The interface circuit 306 receives electrical detector signals SD from the light-sensing elements 200 and processes these signals so that they may be input into processor 302. For example, when light-sensing elements 200 comprise photodiodes, interface circuit 306 may provide appropriate biasing conditions to the photodiodes such that they are able to properly sense light 104. In this regard, interface circuit 306 may be configured to cause certain light-sensing elements 200 to be active and others inactive during particular intervals of time.

The interface circuit 306 may also be configured (e.g., with an integrate-and-dump circuit, not shown) to process analog electrical detector signals SD (e.g., an analog photocurrent) from the photodiodes and convert same to a digital format for processor 302. This configuration improves the signal-to-noise ratio. Two example options for electrically connecting light-source elements 102 and light-sensing elements 200 to controller 300 are a daisy-chain using a bus such as an I²C (two-wire interface) or home runs from the controller to each individual light-sensing element. The former option simplifies wiring while the latter improves performance.

The controller 300 is electrically connected to light-source elements 102 and light-sensing elements 200 via a suitable electrical connection such as the aforementioned bus 301 bus or like electrical cable. In an example, some portion of controller 300 resides on PCBs 112.

The processor 302 may be implemented utilizing suitable hardware, such as standard digital circuitry, any of the known processors that are operable for executing software and/or firmware programs, or one or more programmable digital devices or systems, such as programmable read only memories (PROMs), programmable array logic devices (PALs), etc. An exemplary processor 302 is a PIC microprocessor, available from Microchip Technology, Inc., Chandler, Ariz.

Furthermore, although controller 300 is shown as being partitioned into certain functional blocks (namely, processor 302, driver 304, and interface 306), such blocks may be implemented by way of separate circuitry and/or combined into one or more functional units. The processor 302 may execute different software programs to carry out different techniques for computing the one or more positions of one or more touch events TE based on the methods described below.

As discussed above, controller 300 is configured to coordinate the activation of light-source elements 102 and the detection of light 104 by select light-sensing elements 200. An example method of activating light-source elements 102 is the chase method wherein the light-source elements are activated sequentially around the perimeter in a given direction. However, different methods and sequences of activating light-source elements 102 can be employed. For example, if no touch event TE has been sensed after a select amount of time, then the sequencing might drop into a low-power state in which light-source elements 102 are activated less frequently or in a different order (say, odd-numbered light-source elements only). The light-source elements 102 can also be activated at a higher frequency in some cases, e.g., when a touch event TE is first detected, to improve the resolution in determining the position of the touch event.

Single Touch-Event Method

An aspect of the disclosure includes a method of determining a position for a single touch event TE on touch-screen system 10. A first step in the method includes activating each light-source element 102 to generate a corresponding light beam 104. This first step also includes measuring the light-beam intensities at the corresponding light-sensing elements 200 to obtain a baseline measurement of all of the light-beam intensities for the corresponding light-sensing elements. The baseline measurement intensities are represented by the baseline signal strengths of electrical detector signals SD. This baseline measurement allows for a comparison of the baseline intensities of light beams 104 to the touch-event light-beam intensities to establish whether a touch event TE has occurred and where it occurred. An example method of performing this baseline measurement step is discussed below.

The simplest touch position sensing method is based on a triangulation of interrupted (i.e., attenuated) light beams 104 due to touch event TE. In this method, if the attenuation along light-of-sight 105 between a given light-source element 102 and a given light-sensing element 200 due to touch event TE exceeds a predetermined threshold, then that light beam (or, equivalently that line-of-sight) is labeled as being attenuated, interrupted or "broken," as indicated in FIG. 7 by broken light beams 104-B, namely light beams 104-B1, 104-B2, 104-B3 and 104-B4. In FIG. 7, for ease of illustration, only a limited number of broken light beams 104-B are shown.

Figure 8:
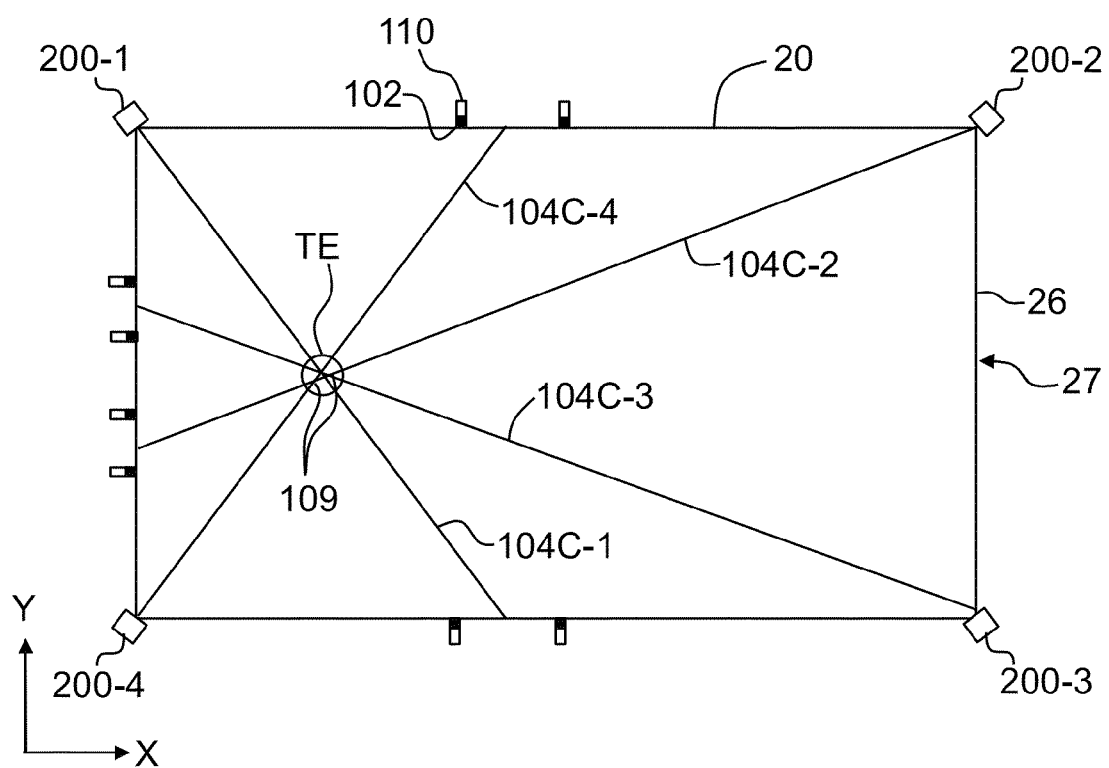
FIG. 8 is similar to FIG. 7 and illustrates a step in the method of determining the position of a touch event by forming centerlines associated with the light ray fans (i.e., the lines-of-sight) and determining the intersections of the centerlines.

A second step in the method is to replace the fan of broken light beams 104-B with a single central line 104C taken along the center of each fan of the broken light beams. Because there are four light-sensing elements 200, there are four central lines 104C (namely 104-C1 through 104-C4), as shown in FIG. 8.

A third step includes computing the locations of intersections 109 of central lines 104C. For ease of illustration, only some of the intersections 109 are labeled. Due to the limited angular resolution, the central lines 104C will not all intersect at a single point. Rather, the four central lines 104C generally produce a cluster of up to six intersections 109 that have (x,y) positions near the true center of touch event TE. Thus, a fourth step includes averaging the (x,y) coordinates of central-line intersections 109 to give a final estimate (x',y') of the position of touch event TE.

Generally, if t is the number of touch events TE and p is the number of light-sensing elements 200, the maximum number $N_M$ of central-line intersections for the t touch events is $N_M=t^2p(p-1)/2$. For a single touch event TE, t=1 and $N_M=t^2p(p-1)/2$. It is noted that the particular example of touch-screen system 10 under consideration has a single touch event TE and four light-sensing elements 200, which yields a maximum of six central-line intersections. Thus, if the actual number $N_A$ of central-line intersections exceeds the maximum number NM, it is an indication that there are multiple touch events than the t touch events assumed.

For example, for a single touch event (t=1) and four light-sensing elements (p=4), if $N_A>6$, then multiple touch events TE have occurred. Thus, an aspect of the methods disclosed herein includes calculating the maximum number $N_M$ of central-line intersections for the t touch events, measuring the actual number $N_A$ of central-line touch events, and comparing the values of $N_M$ and $N_A$, where $N_A>N_M$ indicates more than t touch events.

This method is particularly useful in the case of discerning whether the number of touch events TE is either one or greater than one, i.e., by measuring a number $N_A$ of actual central line intersections and comparing $N_A$ to the value of $N_M$ associated with a single touch event to determine whether the actual number of touch events TE s greater than one.

Simulations were carried out to compare the actual touch position to the calculated touch position (x',y') to determine the amount of error for the example touch screen parameters set forth above. The simulations indicated the error to be about 0.98 mm, which is much smaller than the example 5.25 mm pitch of light-source elements 102. By testing a number of random points, the worst-case position error was found to be about 3 mm, with the typical error being less than 1 mm.

Method for Two Touch Events

The above-described method works very well for a single touch event TE and can be extended to apply to two touch events. This two-touch-event method is now described.

Figure 9:
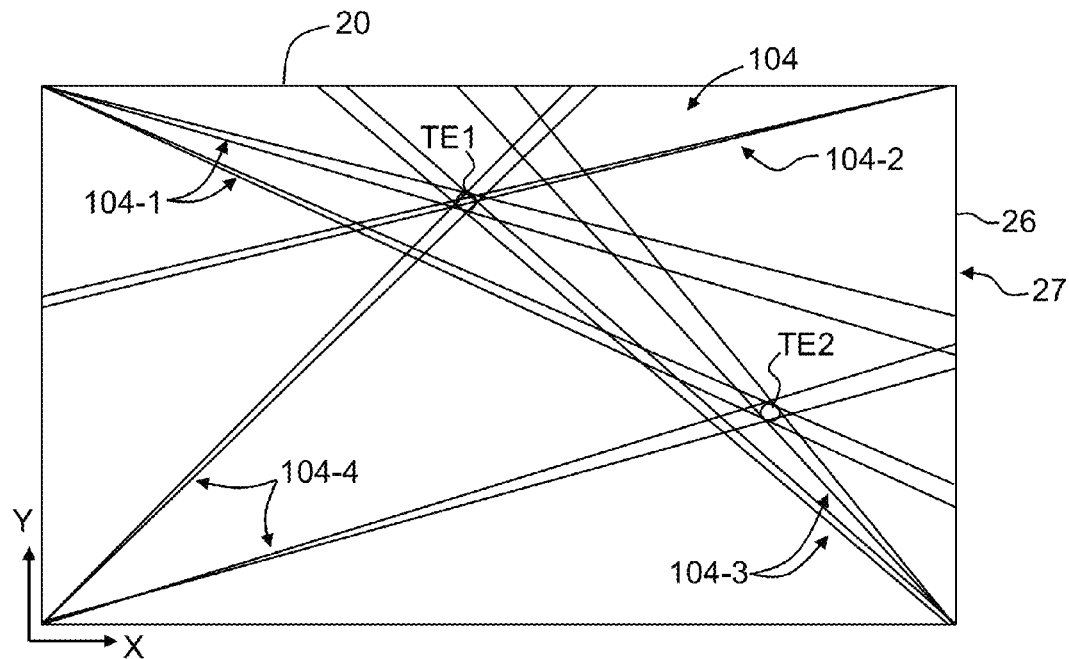
FIG. 9 is similar to FIG. 7 and shows a case consisting of two touch events.
Figure 10:
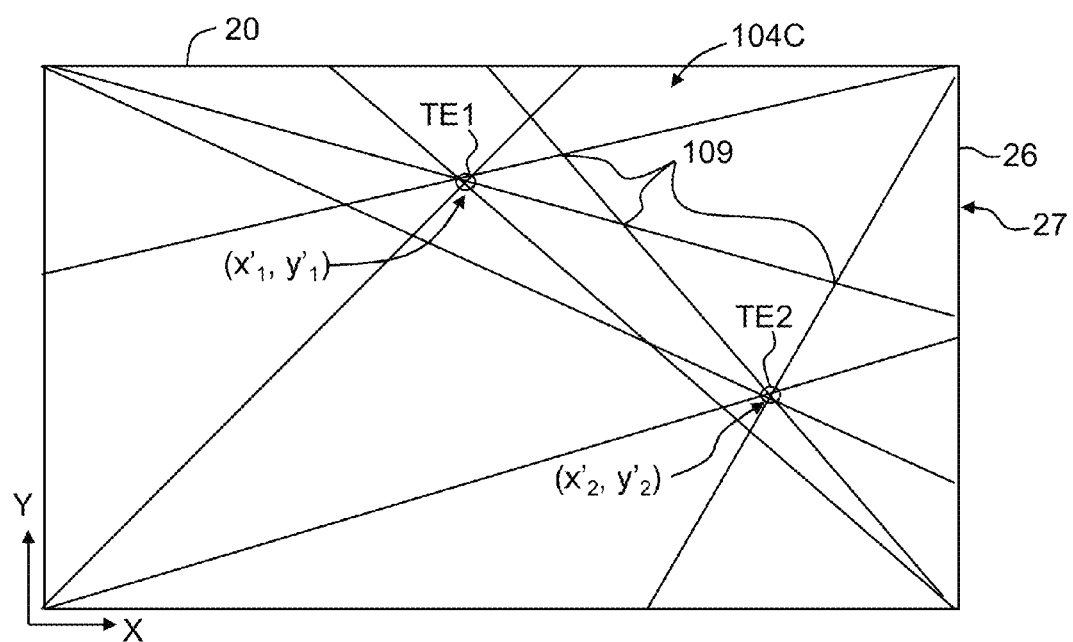
FIG. 10 is similar to FIG. 9 and shows the various centerlines associated with the light ray fans (lines-of-sight) of FIG. 9 for the two touch events.

FIG. 9 is similar to FIG. 7 and illustrates the fans of light rays 104 associated with two touch events TE1 and TE2, with just the limiting rays 104-1 through 104-4 shown for ease of illustration. FIG. 10 is similar to FIG. 9, and shows the central lines 104C based on the fans of light rays 104 of FIG. 9. As can be seen in FIG. 10, with two touch events TE1 and TE2, many of the intersections 109 of central lines 104C are not near the true touch event positions. However, it is also observed that the central-line intersections 109 tend to cluster near the positions of touch-events TE1 and TE2. This characteristic of the trajectories of central lines 104C is exploited to calculate the positions (x'$_1$, y'$_1$) and (x'$_2$, y'$_2$) of the two touch events TE1 and TE2.

Thus, in one embodiment, the intersection coordinates (x$_1$, y$_1$), (x$_2$, y$_2$), etc. of all of the central-line intersections 109 are calculated in much the same manner as the case involving a single touch event TE. If four light-sensing elements 200 are employed, the maximum number $N_B$ of beam intersections is 6 (see above formula for $N_B$) for a given touch event. Thus, if the number of beam intersections measured is greater than six, then it is concluded that there are at least two touch events TE1 and TE2.

For multiple touch events, the next step in the method includes looking for clusters of central-line intersections 109 because the spurious intersections tend to lie at relatively large distance from the actual positions of the touch events. Again, due to the discrete angular resolution of touch-screen system 10, it is expected that there will be some spread in the central-line intersections 109 associated with the corresponding touch events TE1 and TE2. One way to increase the sensitivity to touch events is to increase the number of light-sensing elements 200. In an example, at least one light-sensing element is arranged along edge 26 mid-way between the adjacent corners 28 to increase the measurement sensitivity for multiple touch events that can occur along the diagonal of transparent sheet 20.

In an example, the requirement for determining that a valid touch event TE has occurred is defined as a minimum number M of central-line intersections 109 that are all within a certain distance tolerance D. An example requirement might be that there be at least M=3 intersections 109 within a circle having a radius D=4 mm. The distance tolerance D and minimum number M of intersections 109 can be selected to optimize the results for establishing the validity of touch event TE. In an example, there may be Q intersections 109 within distance tolerance D, where Q≥M.

In a next step, the method includes averaging the (x$_1$,y$_1$), (x$_2$, y$_2$), etc. coordinates of the Q≥M intersection clusters to arrive at the calculated positions (x'$_1$,y'$_1$) and ('x$_2$,y'$_2$) for touch events TE1 and TE2, respectively. As in the single-touch method, in an example the calculated accuracy of the position of touch event TE1 or TE2 can be on the order of a few mm.

The above-described algorithm for multiple touch events TE generally works for two touches but is susceptible to spurious touch results for certain touch-event positions, particularly when the touch event lies near the screen diagonals. This shortcoming is mitigated by tightening the aforementioned central-line intersection requirements, e.g., requiring a greater number M of central-line intersections 109 for a given distance tolerance D.

Example Baseline Measurement Method

As discussed above, one step in the method of determining the position of a touch event TE (or the positions of two touch events TE1 and TE2) includes first performing a baseline measurement of the detector signal strengths when there is no touch event. An example method of carrying out the baseline measurement is now discussed.

The example baseline measurement method provides an estimate for the non-attenuated intensity of each light beam 104 from each light-source element 102 in touch-screen system 10 using light-sensing elements 200. If the estimated detector signal strength associated with detecting an unattenuated light beam 104 with light-sensing element 200 has an amplitude $A_0(t)$ in arbitrary units of strength (e.g., photocurrent in mA), then the generalized current measurement A(t) can be corrected on the fly to give an estimated light-beam transmission function G(t) varying from 0 to 1 for each light beam. For all p light-elements, G(t)→G(p,t).

Assuming some knowledge about the average noise of the intensity measurement using light-sensing elements 200, a reasonable detection threshold value T can be defined. For example, if $N_B$ light beams 104 are measured every second, and the detection of a false touch-event cannot occur with a frequency of more than once per K seconds, then the probability of a false touch event can be given by $1/(N_BK)$. If each transmission measurement G(p,t) has a variance $\sigma^2$, then the detection threshold T can be set to T=G(p,t)=1−zσ, where z is the number of standard deviations as defined by the recursive relationship $\mathrm{erf}(z/\sqrt{2})=(NK-1)/NK$, where "erf" is the error function and "$\sqrt{2}$" is the square root of 2.

Table 1 below shows example values for z as a function of the mean time to false touch (MTFT) detection for an example touch-screen system 10 having 256 light beams 104 running at 50 Hz, which gives $N_BK=(256)(50\,\mathrm{Hz})=12{,}800$. Example touch-screen systems 10 made by the inventors to show proof of principle used switched integrators and had signal-to-noise ratios (SNRs) on the order of 100, resulting in a detection threshold with z=5, and a touch-screen sensitivity of 5%. This detection threshold can be eased by defining a touch event TE as one that requires two or more light beams to be simultaneously broken.

TABLE 1

| MTFT | z |
| --- | --- |
| 1 second | 3.95 |
| 10 seconds | 4.47 |
| 100 seconds | 4.93 |
| 1,000 seconds | 5.37 |

Once the normalized transmission G(t) is established, then the method includes defining two detection states, namely, an idle state ("IDLE") defined as $G(t) \geq T = 1 - \sigma z$ and a touched stated ("TOUCHED") defined as $G(t) < T = 1 - \sigma z$. During IDLE times, the deviation of the new samples from G(t) are accumulated and the standard deviation σ is calculated in a straightforward fashion. This calculated standard deviation σ is then used to refine the detection threshold value T under varying illumination levels and various light beam intensities and SNRs.

The baseline measurement method can be performed in touch-screen system 10 using the following example algorithm, in which a mean deviation s rather than an RMS deviation σ is used. Also, a noise multiplier is chosen empirically to reduce false triggering to an acceptable value. The algorithm operates independently and in parallel on each light beam 104. In the algorithm described immediately below, the tracking step Δ is the amount by which the baseline estimate is changed based on the actual measured signal. The smoothing factor ε is used to smooth out signal variations (see step 7, below).

1. Start with a tracking step Δ, a smoothing factor ε, a noise multiplying factor z, reasonable starting estimates of the baseline amplitude $A_0$ and a mean channel noise s.
2. Measure the signal amplitude A for a given light beam 104 for a given line-of-sight 105.
3. If the measured signal amplitude A is above the baseline estimate $A_0$, then set the baseline estimate to the current input signal, causing $A_0$ to track the upper end of a two-sided noise distribution.
4. If the measured signal amplitude A is below the baseline estimate $A_0$, then reduce the baseline estimate $A_0 = A_0 - \Delta$.
5. Set the normalized signal amplitude $G = A/A_0$.
6. If $T = (A_0 - A) > zs$, then indicate a TOUCHED state.
7. Else, if $T = (A_0 - A) \leq zs$, then indicate an IDLE state. Optionally, the estimate for s can be refined here by setting $s = (1-\epsilon)s + \epsilon(A_0 - A)$.
8. Repeat from step 2 for the remaining light beams 104.

Figure 11:
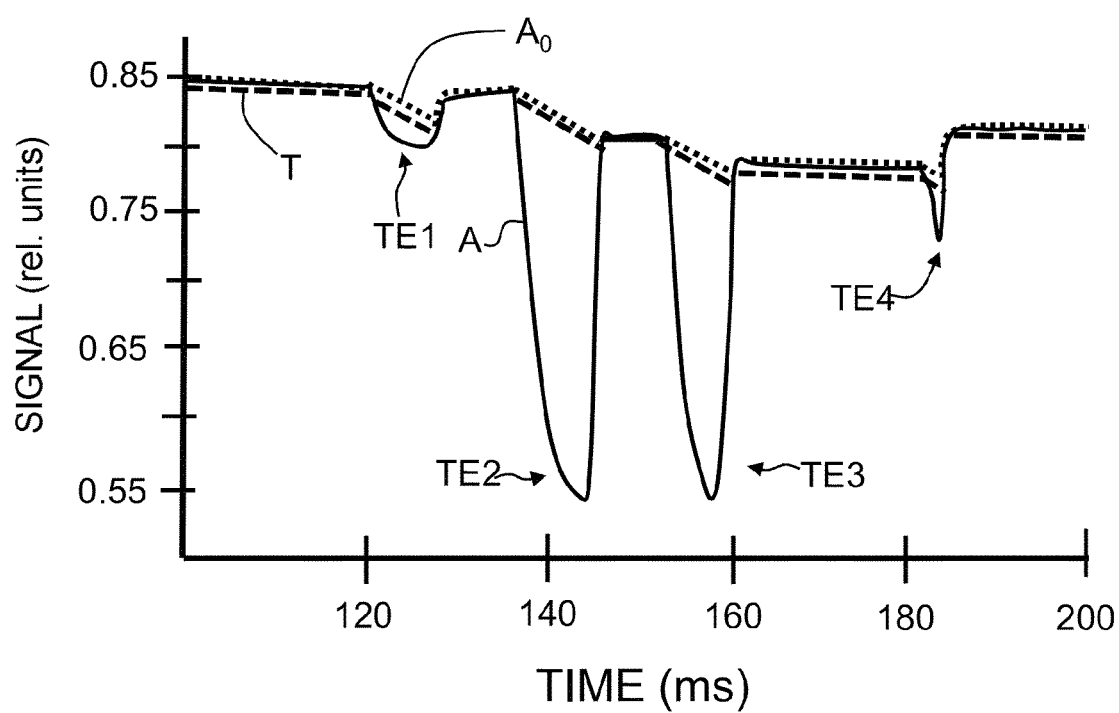
FIG. 11 is a representative plot of the signal strength of the (processed) detector signal (relative units) vs. time (microseconds), based on data obtained from measurements made in an example touch-screen system, for the measured signal A (solid line), the baseline signal $A_0$ (dotted line) and the threshold T (dashed line)

FIG. 11 is a representative plot of the signal strength (relative units) vs. time (microseconds) based on data obtained from measurements made in an example touch-screen system 10, for the measured electrical detector signal SD as denoted by A (solid line), the baseline signal $A_0$ (dotted line) and the signal threshold T (dashed line). The plot illustrates how signal threshold T tracks with the baseline signal $A_0$ and also shows four different touch events TE (namely, TE1 through TE4) that occurred at different times, roughly at 125 ms, 145 ms, 157 ms and 185 ms, respectively.

There are some tradeoffs to be made when selecting the constants Δ, ε, z and s. In an example, the tracking step Δ needs to be set large enough to account for changes in the baseline estimate, but not so large that it obscures a touch event TE by changing the baseline so much that it obscures the occurrence of a touch event. In an example, a maximum signal "droop" is defined, below which the baseline will not be adjusted by Δ. In an example, the value for z can be chosen to be just high enough to eliminate false beam-break events. Some empirical data may be needed to establish a suitable value of z.

The algorithm can be tweaked in a variety of ways known to those skilled in the art to obtain optimum performance under a given set of conditions. By way of example, the algorithm can be made less sensitive to impulse noise, which can cause an unnaturally high baseline value $A_0$. This can be accomplished by tracking the average baseline signal and creating an averaged baseline signal so that any spikes in the measured signal are muted.

Also, adjustments in the baseline signal value $A_0$ can be tuned to handle and distinguish among a wide variety of touch events TE, such as fingerprints on top surface 22 of transparent sheet 20, the cleaning of the top surface, the placing of pressure-sensitive adhesive notes on the screen, etc.

Additionally, the system is capable of utilizing this method to determine the intensity of the touch event TE. This is particularly advantageous for some embodiments where different possible computer processes can be selected based on the intensity of the touch event TE. For example, a strong touch event TE may correspond to the selection or activation of a computer program, whereas a light touch event would correspond to an alternative action.

The baseline tracking methods disclosed herein have a number of advantages. A first is that the non-linear filtering allows for rapid peak tracking and the ability to hold the baseline during touch events. A second is that the touch threshold can be automatically adjusted for dynamic environmental conditions, thereby making the system more robust to detecting touch events and avoiding false-touch events. A third is that the methods can accommodate for touch events that do not return to the previously established baseline, such as steam or residue settling on the top surface 22 of transparent sheet 20. A fourth is that the methods can suppress impulse noise that might otherwise re-set the baseline to an extreme value. A fifth is that the methods can filter out persistent smudges as being touch events.

Touch-Sensitive Display

Figure 12:
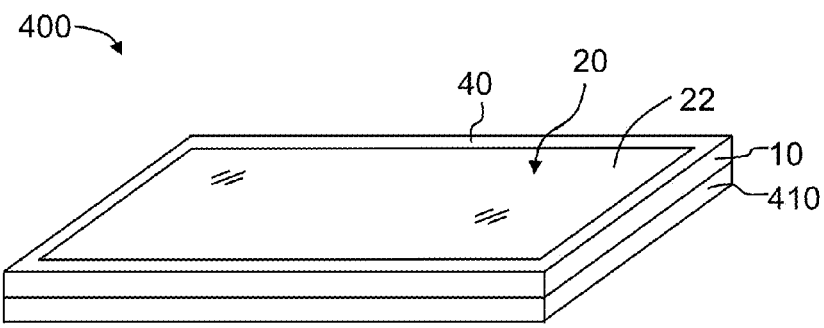
FIG. 12 is a schematic elevated view of an example touch-sensitive display formed by operably arranging the touch-screen system atop a conventional display unit.
Figure 13:
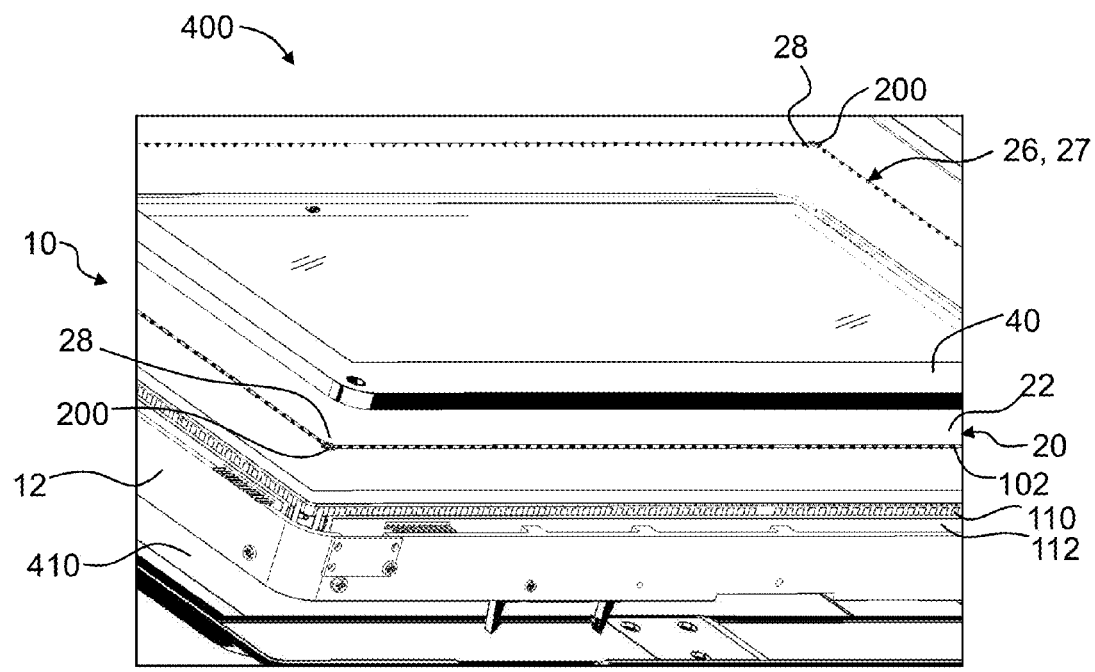
FIG. 13 is an exploded elevated view of an example touch-sensitive display that shows more detail than FIG. 12.

FIG. 12 is a schematic elevated view of an example touch-sensitive display 400 formed by operably arranging touch-screen system 10 adjacent and above (e.g., atop) a conventional display unit 410, such as a liquid crystal display. FIG. 13 is an exploded elevated view of an example touch-sensitive display 400 that shows more detail than FIG. 12. The touch-sensitive display 400 includes bezel 40 that in one example resides atop surface 22 of transparent sheet 20 adjacent edges 26. The touch-screen system 10 is operably arranged atop a display 410 and in an example includes a chassis 12 that supports the various components making up the touch-screen system.

Figure 14A:
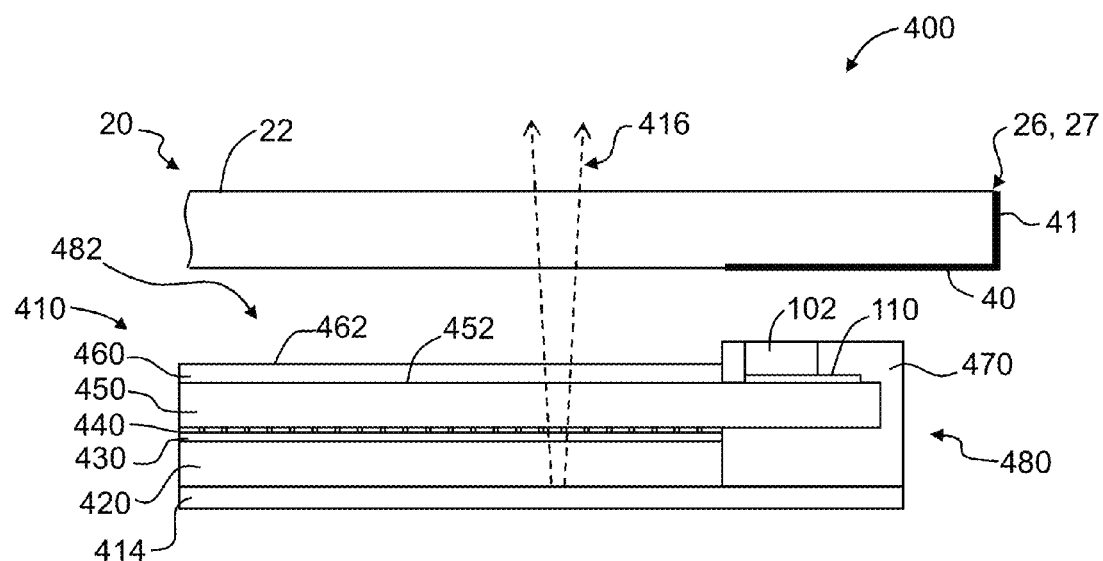
FIG. 14A is a schematic cross-sectional, partial exploded view of an example touch-sensitive display illustrating an example of how to integrate the touch-screen system with a conventional display unit.

FIG. 14A is a schematic cross-sectional, partial exploded view of an example touch-sensitive display 400 illustrating an example of how to integrate touch-screen system 10 with conventional display unit 410. The conventional display unit 410 is shown in the form of a liquid crystal display that includes a backlighting unit 414 that emits light 416, a thin-film transistor (TFT) glass layer 420, a liquid crystal layer 430, a color filter glass layer 450 with a top surface 452, and a top polarizer layer 460 with a top surface 462, all arranged as shown. A frame 470 is disposed around the edge of color filter glass layer 450. The light-source elements 102 are operably supported within frame 470, with flex circuits 110 supported on top surface 452 of color filter glass layer 450 and within the frame. This forms an integrated display assembly 480 having a top side 482.

Figure 14B:
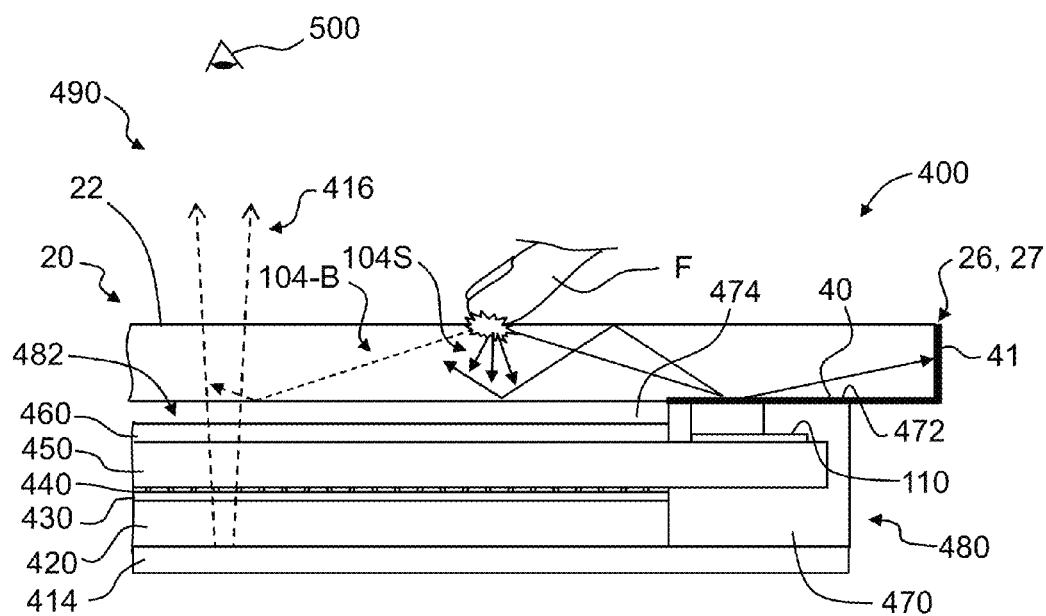
FIG. 14B is similar to FIG. 14A and shows the touch-screen system operably disposed atop the integrated display assembly of the conventional display unit.

With reference now to FIG. 14B, to form the final touch-sensitive display 400, transparent sheet 20 is added to integrated display assembly 480 of conventional display unit 410 by operably disposing the transparent sheet on top side 482 of the assembly. The transparent sheet 20 includes the aforementioned bezel 40 in the form of an IR-transparent but visibly opaque layer. An absorbing layer 41 can also be included at edge 26 of transparent sheet 20 to prevent light 104 from reflecting off the edges of the transparent sheet.

In the embodiment of touch-sensitive display 400 of FIGS. 14A and 14B, light-source elements 102 are face-coupled to bottom 24 of transparent sheet 20 through the IR-transparent bezel 40. There is also an optional air gap 474 formed between transparent sheet 20 and top polarizer layer 460. In an example, various indicia or indicium (not shown) may be presented to user 500 on or through transparent sheet 20 to guide the user to interact with touch-screen system 10. By way of example, the indicium may include areas on top surface 22 of transparent sheet 20 that are set aside for indicating user choices, software execution, etc.

Further Light-Sensing Element Arrangements

In an example embodiment of touch-screen system 10 illustrated in FIG. 6A and FIG. 6B, the light-source elements 102 are mounted on bottom surface 24 of transparent sheet 20 at or near perimeter 27. In this configuration, as much as half of light 104 shines directly through transparent sheet 20 and into the space above where the user 500 resides. If an object happens to be near top surface 22 of transparent sheet 20, such the user's hand (not shown), it can reflect a portion of light 104, and some of this reflected light can find is way to one of the light-sensing elements 200. If the object moves away, then the same light-sensing element that detected the reflected light from the object will now cease to sense such light. This even will be represented in the detector signal and can mimic a touch event TE. This mimicked touch-event signal is also called a "hover signal," because it caused by an object hovering above top surface 22 of transparent sheet 20.

To ensure that only actual touch events are detected by touch-screen system 10, only guided light 104 traveling in body 21 of transparent sheet 20 by total internal reflected can be detected by light-sensing elements 200. Certain embodiments discussed above such as those shown in FIG. 6A and FIG. 6B address the problem suppressing ambient light.

Figure 15A:
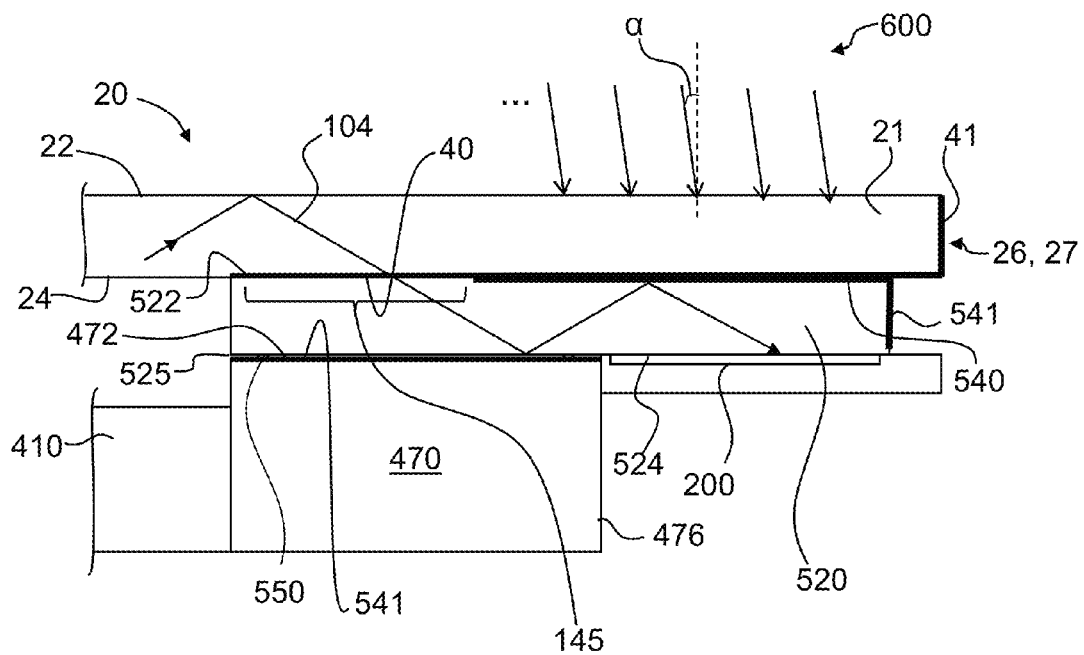
FIG. 15A is a close-up partial cross-sectional view of an example configuration for a touch-sensitive display that is useful for reducing the adverse effects of ambient light.

FIG. 15A is a close-up partial cross-sectional view of an example configuration for touch-sensitive display 400 that is useful for reducing the adverse effects of ambient light 600 (and in particular, sunlight) on the detection of light 104 from light-source elements 102. The example configuration includes a slab waveguide 520 having a top surface 522 and a bottom surface 524. The slab waveguide 520 is disposed with its top surface 522 adjacent bottom surface 24 of transparent sheet 20. The slab waveguide 520 is arranged adjacent edge 26 of transparent sheet 20 and extends a short distance inward so that it at least covers light-sensing elements 200. One of the light-sensing elements 200 is shown in the cross-sectional view.

The slab waveguide 520 is stood off from a frame upper surface 472 by stand-off members 550 disposed between the frame upper surface and bottom surface 524 of the slab waveguide. An IR-transparent bezel 40 disposed on bottom surface 24 of transparent sheet 20 serves as a filter that blocks visible light but that transmits IR light 104. A reflecting layer 540 is disposed on a portion of top surface 522 of slab waveguide 520, and serves to assist in reflecting IR light 104 toward light-sensing element 200, which is disposed adjacent a portion of bottom surface 524 of the slab waveguide. In an example, frame upper surface 472 includes a light-absorbing layer 541.

By using bezel 40 as an IR filter that passes light 104 having an IR wavelength of about 950 nm but that blocks other wavelengths of light including those of ambient light 600, such as sunlight, room light or any other light that is not light 104, light-sensing element 200 can detect light 104 without substantial interference from the ambient light. The reflecting layer 540 acts as a shield to prevent ambient light 600 from being directly incident upon light-sensing element 200 while also assisting in reflecting light 104 toward the light-sensing element. Here, this reflecting assistance may include reflecting light 104 that might not otherwise reflect within body 21 of transparent sheet 20 by total internal reflection.

With continuing reference to FIG. 15A, consider light 104 traveling within body 21 of transparent sheet 20 via total internal reflection. As a given light ray 104 traverses transparent sheet 20 toward light-sensing element 200, it has an opportunity to enter slab waveguide 520 at a window 145 defined by the beginning of the mini waveguide and the leading edge of reflecting layer 540. The light rays 104 that do not enter this window 145 continue traveling in transparent sheet body 21 and eventually are absorbed at edge 26 by absorbing layer 41 disposed thereon.

The light rays 104 that enter window 145 have an opportunity to be incident upon light-sensing member 200. To do so, light ray 104 must undergo internal reflection within mini waveguide 520 at its lower surface 524 and reflect from reflecting layer 540 to travel toward light-sensing element 200. Note that reflecting layer 540 prevents light ray 104 from re-entering transparent sheet 20 and generally provides no opportunity for the light ray to escape prior to striking light-sensing element 200.

Now consider ambient light (i.e., ambient light rays) 600. The behavior of ambient light rays 600 depends in part upon the incident angle α that the ambient light rays make with top surface 22 of transparent sheet 20. If the incident angle α is very shallow (i.e., α is close to 90 degrees, or grazing incidence), ambient light rays 600 will be reflected from top surface 22 and not enter transparent sheet body 21. The ambient light rays 600 having a smaller incident angle α will travel directly through transparent sheet 20. If such ambient light rays 600 are incident upon reflecting layer 540, they will be reflected back out of top surface 22 of transparent sheet 20.

If ambient light rays 600 pass through transparent sheet 20 and also pass through window 145 and into slab waveguide 520, then visible wavelengths will be absorbed by the IR-transparent bezel 40. The IR portion of ambient light rays 600 will continue traveling but will exit bottom surface 524 of slab waveguide 520, passing through an air gap 525 between frame upper surface 472 and the bottom surface of the slab waveguide. This IR-component of ambient light rays 600 is absorbed by the absorbing layer 541 on frame upper surface 472 of frame 470.

Thus, the configuration of FIG. 15A enhances the detection of light 104 in light-sensing elements 200 in the presence of ambient light 600, substantially preventing the ambient light from reaching the light-sensing elements. This is advantageous for any touch-screen system 10 that may be used outside in direct ambient light 600, particularly sunlight.

Figure 15B:
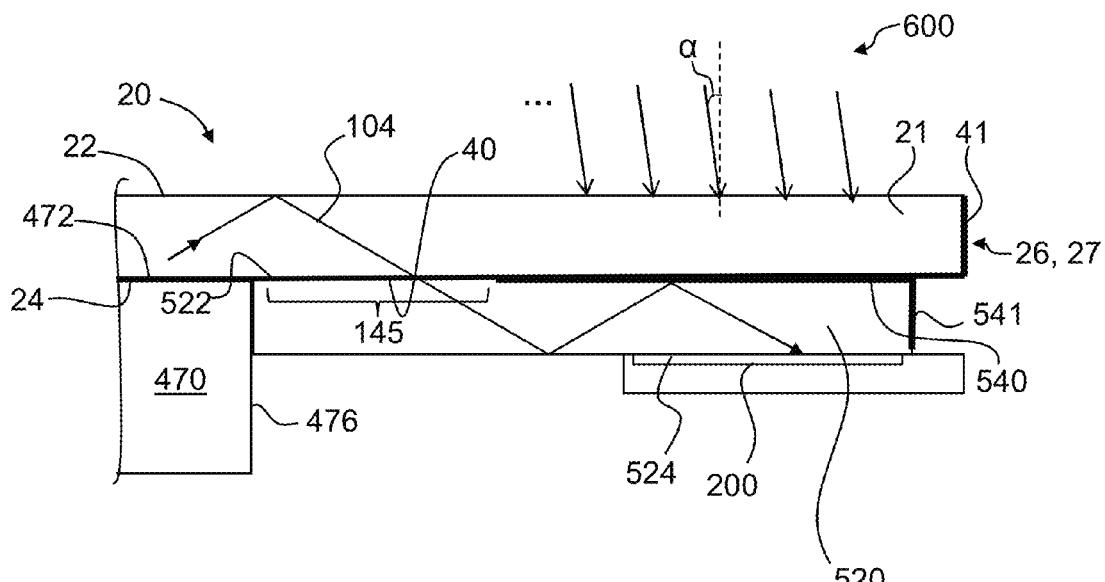
FIG. 15B is similar to FIG. 15A and illustrates an example touch-sensitive display having a thinner configuration than that of FIG. 15A.

FIG. 15B is similar to FIG. 15A and illustrates an example embodiment wherein touch-sensitive display 400 has a thinner configuration than that of FIG. 15A. In the configuration of FIG. 15B, slab waveguide 520 now resides adjacent a side 476 of frame 470 rather than atop upper surface 472 of the frame. In this embodiment, IR-transparent bezel 40 is extended by the width of frame 470.

Figure 15C:
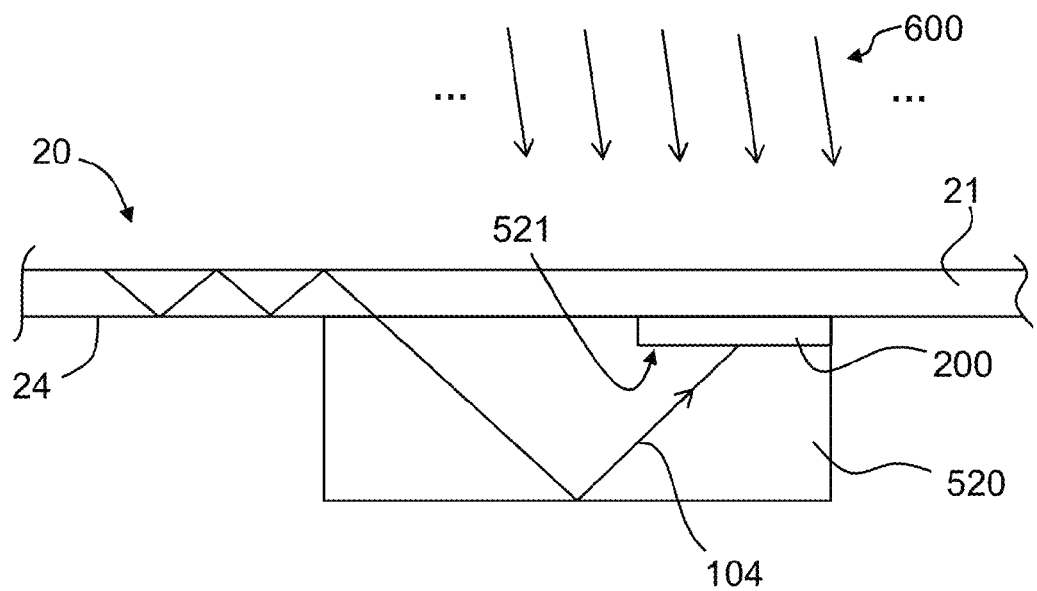
FIG. 15C is similar to FIG. 15B and illustrates an example embodiment where light-sensing element 200 is disposed so that it faces upside-down.

FIG. 15C is similar to FIG. 15B and illustrates an example embodiment where light-sensing element 200 is disposed so that it faces upside-down. In this configuration, light 104 enters slab waveguide 520 which is configured relative to transparent sheet 10 so that the light is totally internally reflected upward towards light-sensing element 200. Slab waveguide 520 includes a shelf 521 configured to accommodate light-sensing element 200. This configuration is advantageous in that the light-detecting element 200 faces away from the general direction of ambient light 500. It also obviates the need for IR-transparent bezel 40.

Figure 15D:
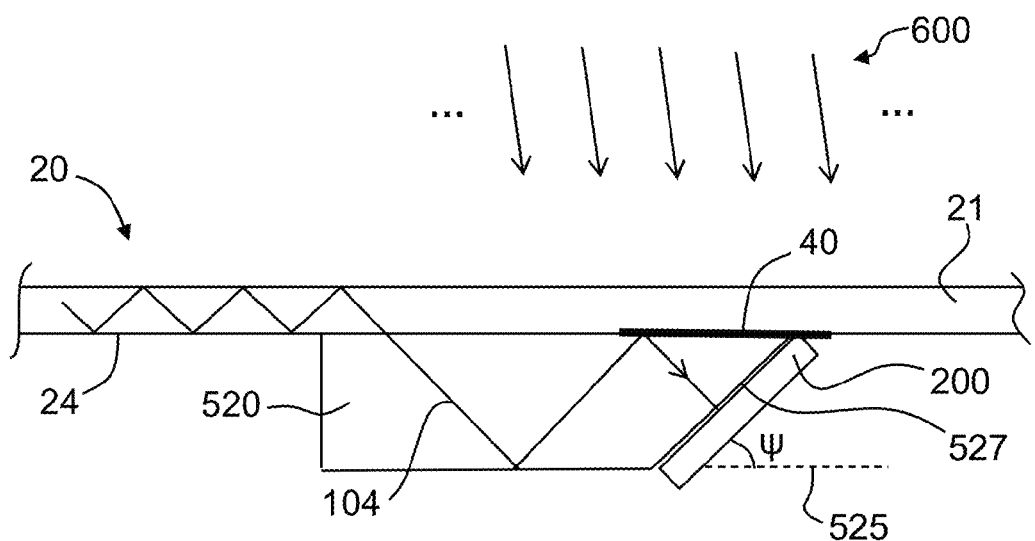
FIG. 15D is similar to FIG. 15C and illustrates an example embodiment where light-sensing element 200 is disposed adjacent an angled facet 527 of slab waveguide 520 at a detector angle ψ, relative to the horizontal.

FIG. 15D is similar to FIG. 15C and illustrates an example embodiment where light-sensing element 200 is disposed adjacent an angled facet 527 of slab waveguide 520 at a detector angle ψ, relative to the horizontal. In an example, "horizontal" is defined relative to a plane 525 defined by planar bottom surface 524 of slab waveguide 520. In an example, detector angle ψ, can be between 0 and 90 degrees, while in another example can be between 0 and 135 degrees. In the case where ambient light 600 could be incident upon light-source element 200, IR-transparent bezel 40 can be disposed between slab waveguide 520 and transparent sheet 20 to cover the light-source element.

Robust Detection of Multiple Touch Events

An aspect of the disclosure includes robust detection methods for multiple touch events. The robust touch-event methods utilize a tomographic-based algorithm that can handle multiple touch events and that is particularly suited for a relatively high number of simultaneous touch events, such as five or more.

Rather than using a beam-break approach and the intersection of centerlines as discussed above, the present method employs tomographic techniques wherein transparent sheet 20 is treated as an imaging plane. The principle difference in the touch-screen systems and methods disclosed in this section as compared to those described above is that the present systems and methods benefit from the touch-screen system having a robust processor 302, such as FPGA, ASIC for processing the electrical detector signals SD, and the use of a more complex tomographic algorithm for detecting multiple touch events TE.

An example of the tomographic method of finding the positions of multiple touch events TE includes performing steps associated with making measurements of the intensity of light 104 traveling over the respective lines-of-sight 105 associated with each light-sensing element, including establishing the baseline measurements as described above.

Then, in the next step, the set of intensity measurement for each light-sensing element 200 is analyzed to find "gaps", i.e., those intensity values where the attenuation is above an attenuation threshold TA. A typical touch event requires approximately a 1% power resolution for reliable detection. The coordinates of the two ends of the gap associated with light-source elements 102 and the coordinates of the given light-sensing element 200 define two limiting lines-of-sight 105 that form a triangle with the particular light-sensing element and light-source elements. In an example, the intensity associated with each line-of-sight 105 within the triangle is stored so that later on a weighted average (i.e., center-of-mass) calculation can be performed based on the attenuation values, as described below.

Figure 16A:
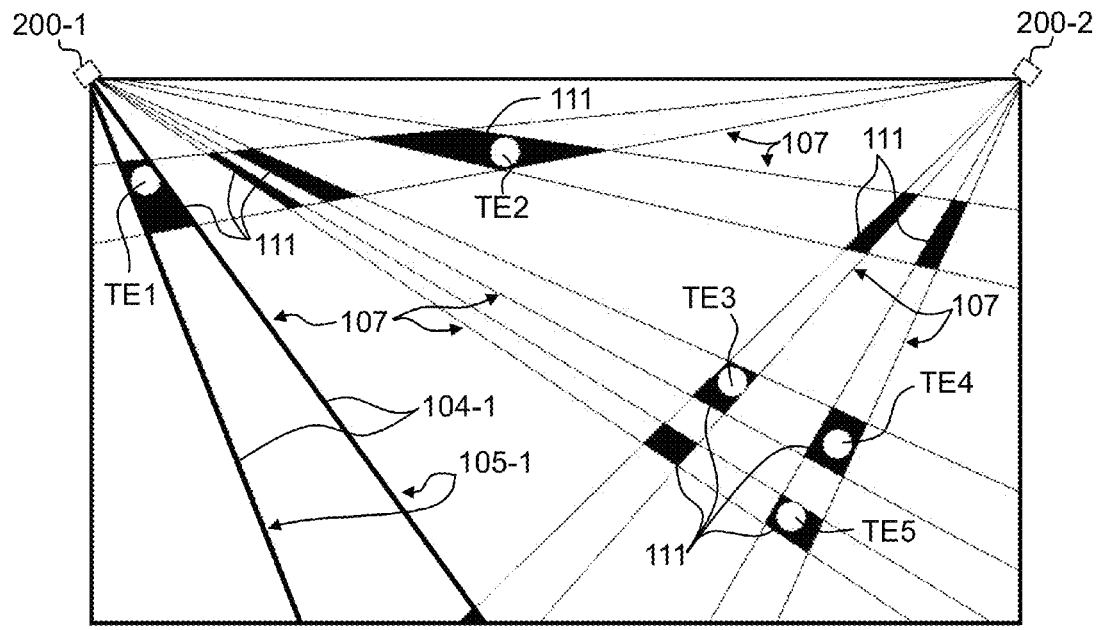
FIG. 16A is similar to FIG. 9 and highlights (using darker lines) one example triangle formed by the limiting lines-of-sight.

FIG. 16A is similar to FIG. 9 and highlights (using darker lines) one example triangle 107 formed by light beams 104-1 that define the limiting lines-of-sight 105-1. The touch-screen system 10 of FIG. 16A has by way of illustration only two light-sensing elements 200 in the upper left and upper right corners, respectively, as shown in phantom.

After processing all of the measured intensities for the first light-sensing element 200, a list of triangles 107 is generated. A similar list of triangles is generate for the next light-sensing element. A total of seven triangles 107 are present in FIG. 16A.

Then, all of the possible overlaps between triangles 107 for the first and second light-sensing elements are examined. The resulting overlapping triangles define a list of quadrilaterals, which are now polygons 111 that define potential touch positions TE1, TE2, TE3 and TE4, as shown in FIG. 16A. This process is repeated with the next light-sensing element 200 whereby its list of triangles 107 is examined for overlap with the polygons 111 generated so far. This process is repeated for all g light-sensing elements 200.

Figure 16B:
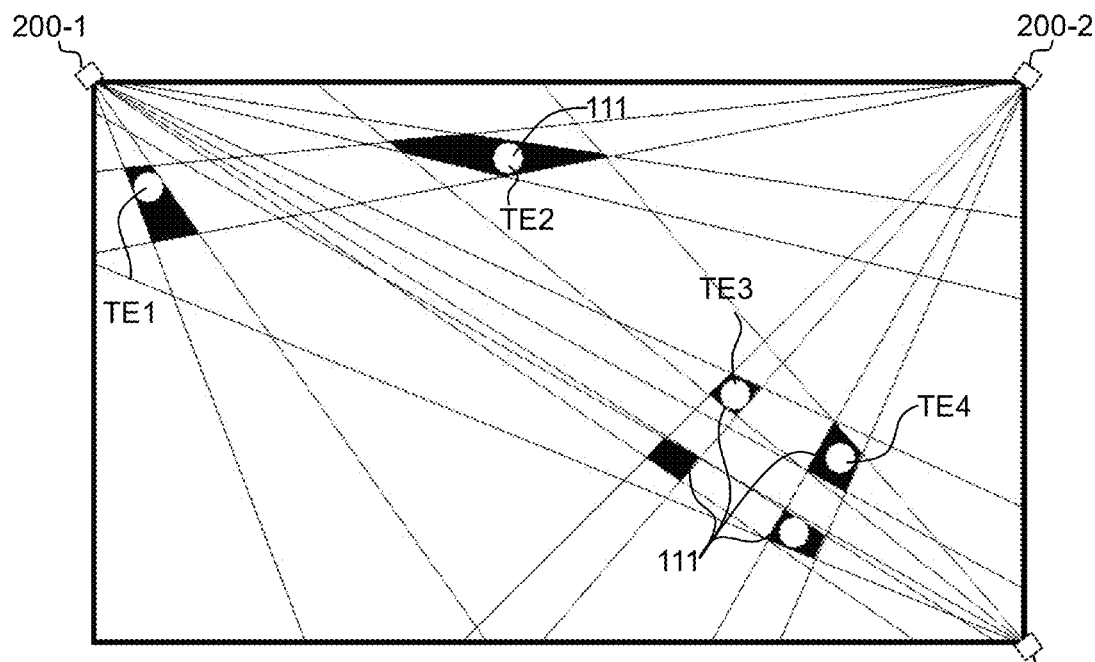
FIG. 16B is similar to FIG. 16A, but with most of the non-touch polygons removed.

After generating a list of the possible touch polygons 111, the intensity attenuation (i.e., the strength of electrical detector signal SD) associated with each polygon 111 is determined. Since the number of polygons 111 is relatively small (e.g., 10 to 20), if uniform attenuation is assumed, then one can solve a system of n×m, where n is number of polygons 111 and m is number of measurements above (i.e., greater than) the attenuation threshold TA, i.e., inside the areas defined by the triangles. With reference to FIG. 16B, which represents a touch-screen system with three light-sensing elements 200 (but with the same configuration of touch events TE1 through TE4), the m polygons remaining then define touch events TE1 through TE4. Note that one polygon 111 remains that is not associated with a touch event TE. This polygon 111 represents a false touch event and so is eliminated.

This method can be stated more mathematically. First, for each light-sensing element 102k, examine the set or array of consecutive normalized intensity measurements Mi, and find intervals where Mi<TA (i1≤i≤i2). The coordinates of light-source elements 102-i1 and 102-i2 and the coordinates of detector 102k form a triangle.

Once the lists of triangles 107 for all light-sensing elements 200 is completed, the intersections of the triangles 107 for the first and second detectors are determined, wherein the intersection of two triangles will create one of the polygons 111. The list of all polygons is referred to as being "generation 2."

Next, the intersection of any of the generation 2 polygons 111 with triangles 107 from the third light-sensing element 200 are identified to create polygons 111 of "generation 3." This process is repeated to obtain up to generation g polygons 111, where g is the number of light-sensing elements 200.

Next, for each measurement $M_i$ that is below the attenuation threshold T, solve the following equation:

$$\sum_{j=1}^{P} w_{ij} X_j = -\ln(M_i) \quad (1)$$

where $w_{ij}$ represents the length of the line-of-sight 105 from a given light-sensing element 200 to a given light-source element 102 that passes through polygon j. The parameter $X_j$ is the attenuation per unit length for polygon j.

Next, since equation (1) above can be expressed for many measurements, the total number m of equations exceeds the number p of polygons 111. Thus, equation (1) can be written in matrix form as:

$$WX=M. \quad (2)$$

Multiplying both sides with the transpose of W, i.e., transposed $W^T$, yields:

$$(W^T W)X = W^T M, \quad (3)$$

which allows X to be expressed as:

$$X = (W^T W)^{-1} W^T M \quad (4)$$

Matrix ($W^T W$) is of dimension p×p. Now the attenuation associated with each polygon 111 is determined using Equation (4). If any polygon's attenuation is below (i.e., lower than) the attenuation threshold T, it is eliminated as being representative of a touch event TE. The remaining polygons 111 are then considered as being representative of touch events TE.

Next, the center-of-mass coordinates (x', y') (e.g., the geometric center) for each remaining polygon 111 are calculated and are considered as the measured touch event coordinates. The area of each polygon 111 and its corresponding attenuation value is provided to processor 302.

In an example, it is assumed that the attenuation value for a given polygon 111 is constant, e.g., an average over the attenuation values associated with the polygon. In another example discussed in greater detail below, the attenuation value is the weighted average or center-of-mass based on a variation in attenuation values associated with a given polygon 111.

Figure 17A:
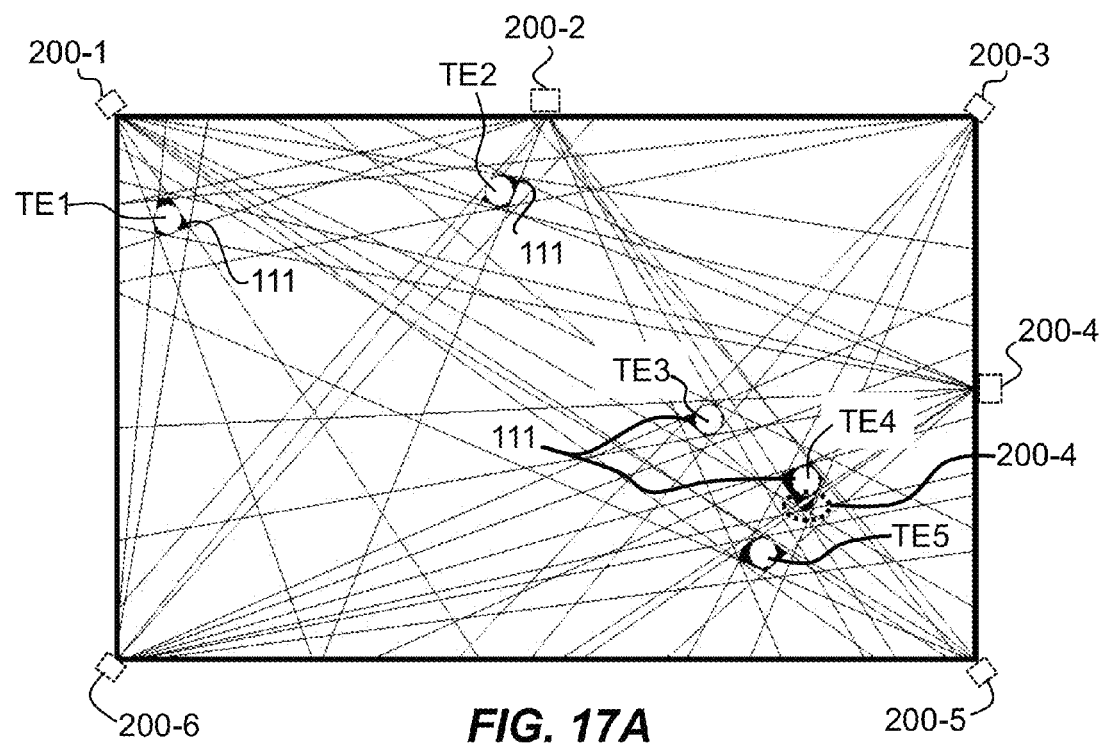
FIG. 17A shows the polygons for an example touch-screen system having six light-sensing elements, wherein only one small polygon (dotted-line oval) remains that represents a false touch.
Figure 17B:
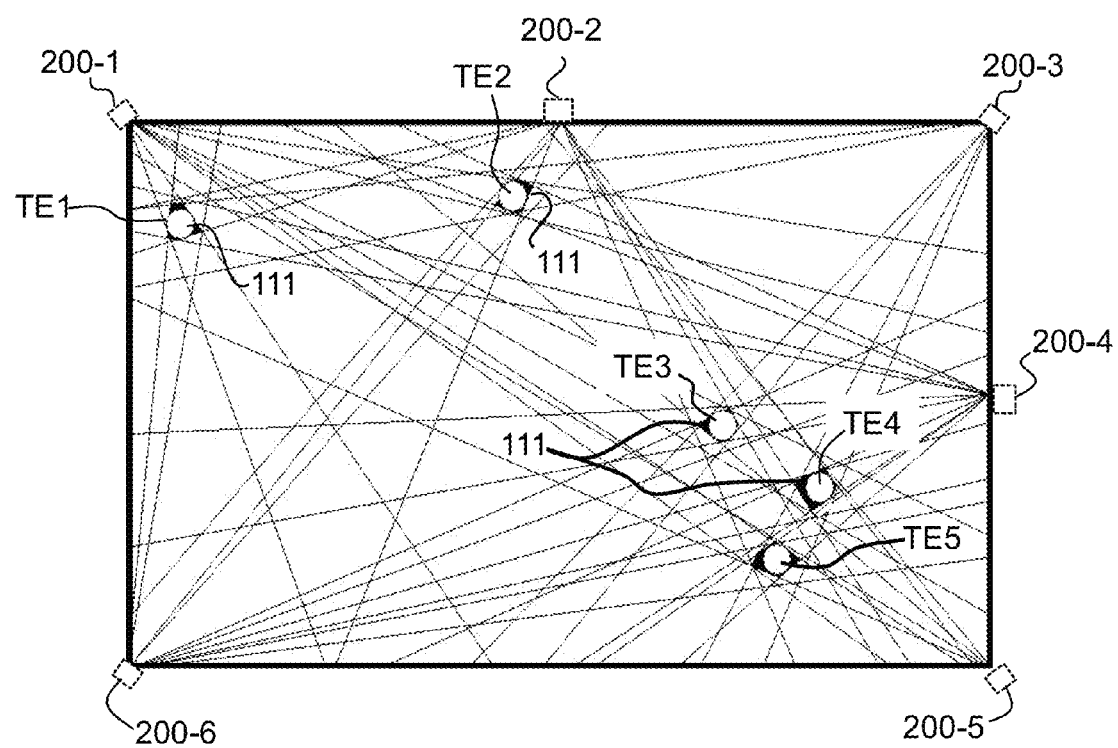
FIG. 17B is similar to FIG. 17A, except that the one small polygon identified by the dotted-line oval FIG. 17A as a non-touch polygon has been eliminated based on its small attenuation value.

FIG. 17A shows the polygons 111 for a touch-screen system 10 having six light-sensing elements 200, wherein only one small polygon 111 (dotted-line oval) represents a false touch. FIG. 17B is similar to FIG. 17A, except that the one small polygon 111 identified by the dotted-line oval FIG. 17A has been eliminated based on its small attenuation value. The resulting polygons 111 are all tightly associated with the positions of the actual touch events TE1 through TE5.

Polygonal-Bounded SART Method

Figure 18:
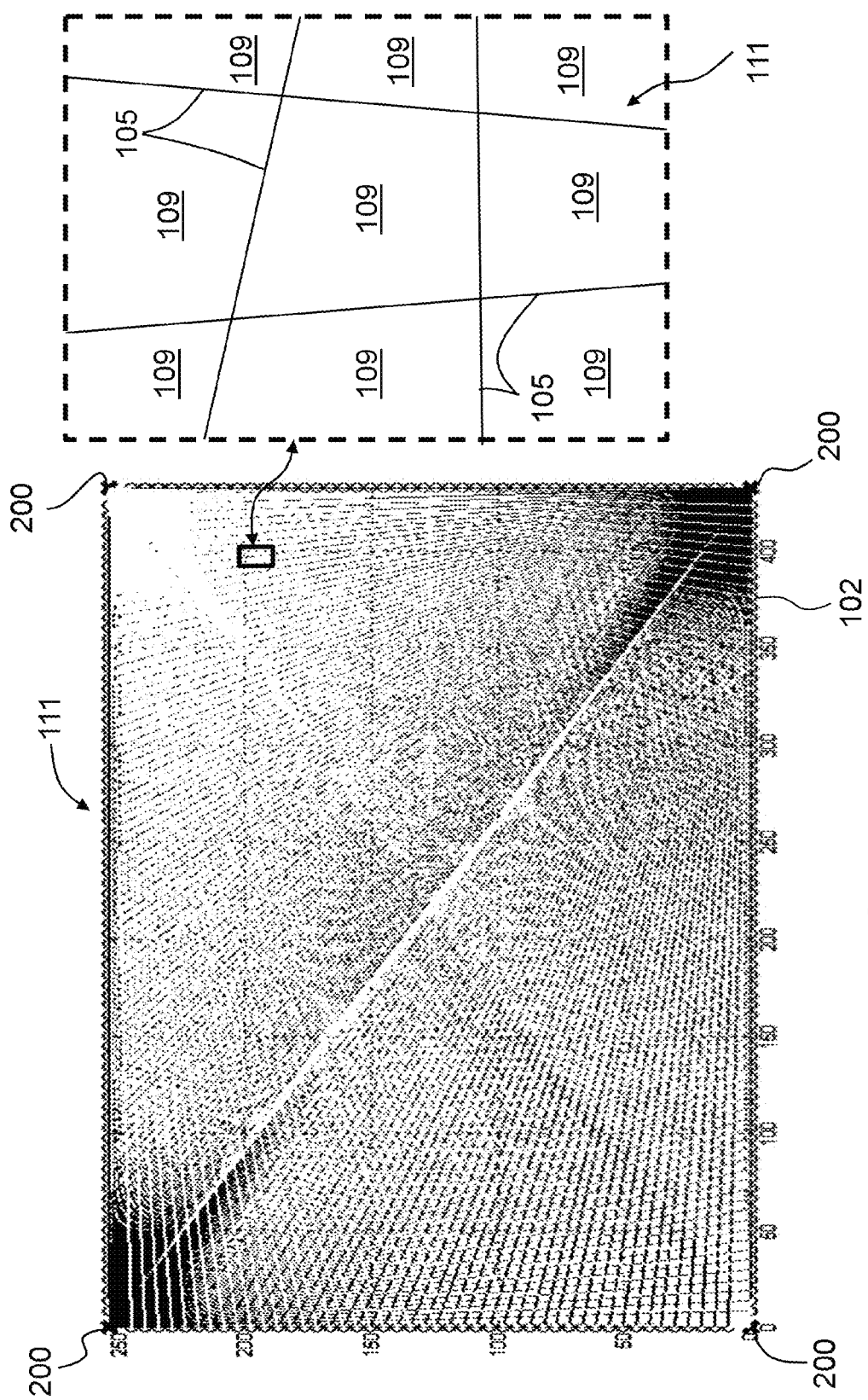
FIG. 18 is a schematic diagram illustrating the mesh formed by all of the lines-of-sight as defined by the light-sensing elements and light-source elements, with the close-up inset showing how a pixel is defined within the mesh.

FIG. 18 shows a mesh 111 defined by the lines-of-sight 105 formed by the collection of light-source elements 102 and light-sensing elements 200 for the above-described example touch-screen configuration having four corner light-sensing elements 200 and eighty light-source elements 200 along the long edges and forty-six light-source elements along the short edges. The dimensions shown along edges 26 are in millimeters. With reference to the close-up view in FIG. 18, mesh 111 defines pixels 109, which are the smallest areas defined by the mesh. In an example, pixels 109 are defined by dividing the top surface 22 of transparent sheet 20 into small regions equal to or smaller than a select touch-event resolution. The pixels 109 can have a square or round shape, and in some instances the pixels can overlap Each polygon 111 therefore includes one or more pixels 109, and each pixel has associated therewith an attenuation value.

Thus, in an example embodiment, the attenuation values associated with the pixels 109 within a given polygon 111 are determined using a simultaneous algebraic reconstruction technique (SART) algorithm. In this aspect of the method, a subset of pixels 109 can be used so that the solution can be determined much faster than by using the full SART algorithm with a full set of pixels.

The SART algorithm is based on the relationship $$x_j = x_j + \lambda \frac{1}{\sum_{i=1}^{m} w_{ij}} \sum_{i=1}^{m} \left( \frac{b_i - \sum_{j=1}^{n} w_{ij} x_j}{\sum_{j=1}^{n} w_{ij}} \right) \quad (5)$$

For each measurement point i we can write the equation:

$$\sum_{j=1}^{n} w_{ij} x_j = b_i$$

where $b_i = -(M_i)$ where $M_i$ is measured light intensity, $x_j$ is unit attenuation of pixel j, and $w_{ij}$ is weight (i.e., the fraction of the pixel area) contributing to measurement i. It can be also be a line length inside given pixel.

Thus, the term $$b_i - \sum_{j=1}^{n} w_{ij} x_j$$

(written in matrix form as B−WX) represents error in satisfying equation (5). The SART Algorithm adjusts values of $x_j$ proportional to a combination of errors from all equations involving a given pixel. The proper combination of the errors is determined by the coefficients $w_{ij}$. At the end, the entire adjustment is scaled by the coefficient λ, which is an adjustment step that determines the speed of the convergence. If λ is too big, the iterative process may diverge. If λ is too small, it will take more iterations to converge.

In an example, rather than trying to solve the matrix equation WX=B, the overall attenuation is minimized via the relationship $$\min_{X} \sum_{j=1}^{n} x_j$$

while still satisfy constraints given by the matrix relation WX≥B. By the nature of the algorithm, the number of non-zero attenuation pixels 109 cannot exceed the number of measurements (i.e., the number of equations).

If the linear cost function is replaced by a nonlinear function that is sub-linear, then solutions with less non-zero attenuation pixels are favored. One such function would be:

$$\min_{X} \sum_{j=1}^{n} \sqrt{x_j}$$

with the constraint WX≥B.

Figure 19A:
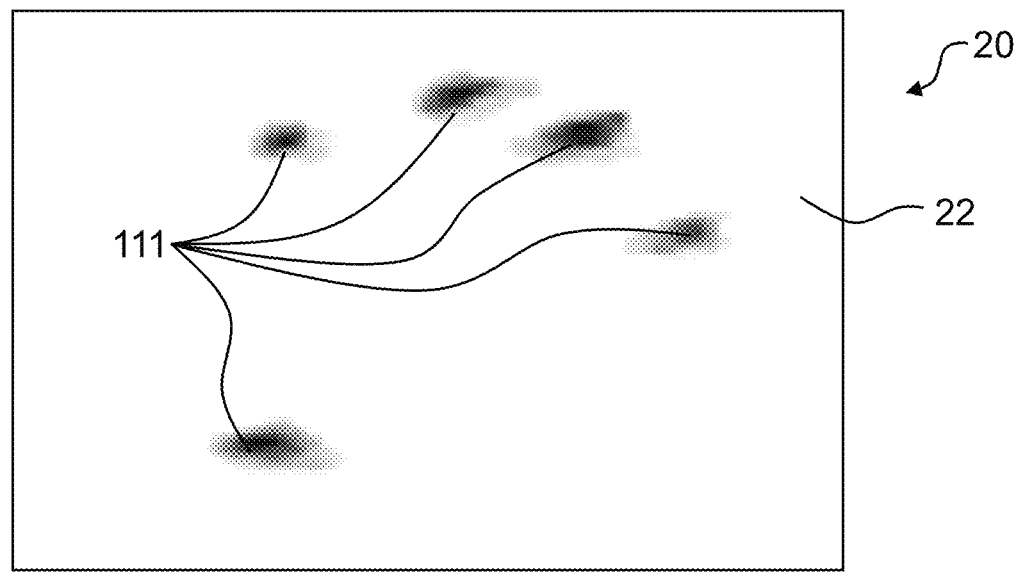
FIG. 19A is a computer image of the transparent screen showing the locations of the polygons as determined by the SART algorithm based on the raw measurement data.
Figure 19B:
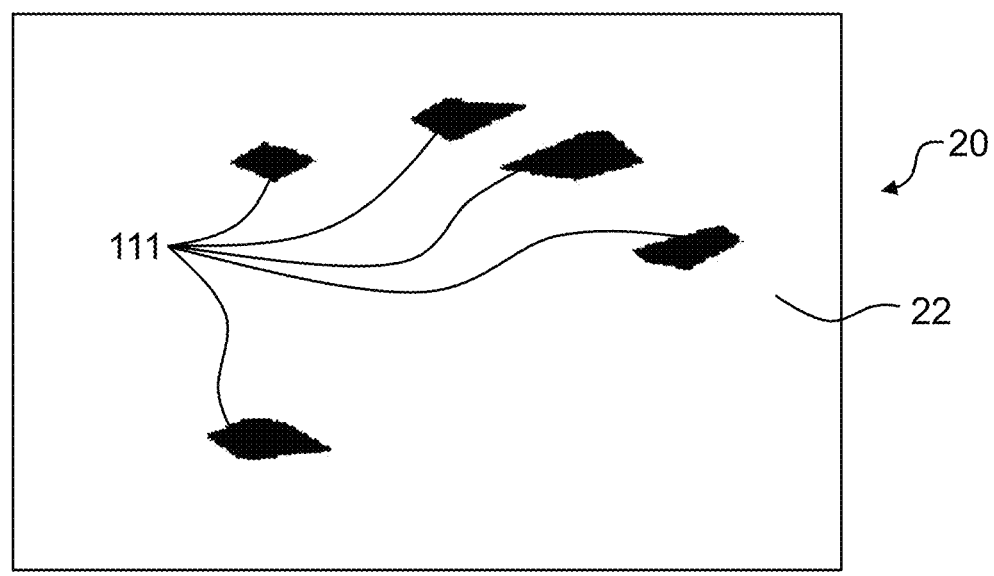
FIG. 19B is similar to FIG. 19A and shows the SART results for the bound-polygon embodiment of the method.

FIG. 19A is a computer screen image of the polygons relative to transparent sheet 20 as determined by the SART algorithm based on the raw measurement data. FIG. 19B is similar to FIG. 19A and shows the SART results for the bound-polygon embodiment of the method.

Reduction of Illumination Interference by a Two-Step Measurement Processes

Given a detector signal SD in the form of a photocurrent $i_d$ from one of light-source elements 102, and an interfering photocurrent $i_e$ from an extraneous (i.e., external or ambient) light source, one method of suppressing the signal interference would be to make two measurements. The first measurement would be the photocurrent with the light-source element 102 turned off to determine the average interfering power. The second measurement would be with the light-source element 102 turned on. A subtraction of the two measurements would cancel the DC interference of the extraneous photocurrent from the measurement. However, the interfering light typically has a random shot noise term that cannot be cancelled. The corrected detector signal SD is thus partially contaminated with noise, though the corrected detector signal is improved (i.e., has a better SNR) over the uncorrected detector signal.

For slowly varying interferers, the measurement period with light-sensing element 102 turned off can be filtered with a long time constant to suppress the shot noise contamination. The measurement taken with the light-sensing element turned on can then be corrected by subtracting the average of the interference signal.

For rapidly varying interference sources, an example two-step method can be used that includes making a photocurrent measurement with light-source element 102 turned on and then subtracting an identical photocurrent measurement with light-source element 102 turned off. This leads to 3 dB worse shot noise contribution from the interfering power compared to the above-described filtered approach, but provides the fastest tracking of the interference changes. If a custom integrator is designed, then one can integrate up when the light-source element 102 turned on, and then integrate down for the same time when the light-source element is turned off. This is equivalent to making and subtracting two measurements.

A more detailed description of the aforementioned example two-step measurement approach to improve the SNR of the detector signal SD is as follows. A constant photocurrent $i_d$ has an associated random shot noise current with a RMS current fluctuation $\sigma = \sqrt{2qi_d \Delta f}$, where q is the elementary charge of an electron and $\Delta f$ is the signal frequency bandwidth in Hz. A switched integrator with integration time $\Delta t$ has an effective noise bandwidth of $1/\Delta t$. Integrating onto a capacitance C, at the end of a cycle the signal is $$\frac{i_d \Delta t}{C}$$

so that $$\sigma = \sqrt{\frac{2qi_d/\Delta t}{C}}.$$

An example of the disclosure is a two-step measurement of dark current to reduce or eliminate adverse effects of an interfering photocurrent. In the first measurement step, the interfering photocurrent $i_e$ is integrated to produce a charge estimate from the interference signal, namely $i_e \Delta t$ with $\sigma = \sqrt{2qi_e/\Delta t}$. The second measurement step measures the detector signal photocurrent $i_d$ plus the interfering photocurrent signal and produces a net charge $(i_e + i_d)\Delta t$ with $\sigma = \sqrt{2q(i_e + i_d)/\Delta t}$. Subtracting the two measurements leads to an estimate of the detector signal photocurrent $i_d \Delta t$, with $\sigma = \sqrt{2q(2i_e + i_d)/\Delta t}$. The charge SNR is then:

$$SNR = i_d \sqrt{\frac{\Delta t}{2q(2i_e + i_d)}}$$

The above equation for the SNR indicates that the interfering photocurrent $i_e$ contributes twice its fair share because it is integrated twice, while the desired detector photocurrent $i_d$ is integrated only once. An improvement to the SNR can be achieved by subtracting a low-pass filtered version of the interfering photocurrent $i_e$. A non-linear digital filter can be implemented that has a time constant parametrically dependent on the error between the measurement and the filter value. This strategy would allow rapid accommodation to changes in background light, and would asymptotically take out the variance of the measurement after several sample cycles. Removing the variance of the background estimate gives a charge SNR of $$SNR = i_d \sqrt{\frac{\Delta t}{2q(i_e + i_d)}} \quad (2)$$

which is about 3 dB better that that of Eq. 1 when $i_e \gg i_d$.

Reduction of Interfering Illumination by Current Injection

FIG. 20A is a schematic diagram of an electrical circuit 700 configured to reduce the adverse effects of interfering illumination through the use of current injection. Electrical circuit 700 includes a light-sensing element 200 in the form of a photodiode. Photodiode 200 received light 104 and in response generates a photocurrent $i_d + i_e$, as described above. The photodiode is arranged in parallel with a digital-to-analog converter (DAC) 720 and drives an amplifier 710. Amplifier 710 can be a transimpedance amplifier or an integrating amplifier.

Figure 20:
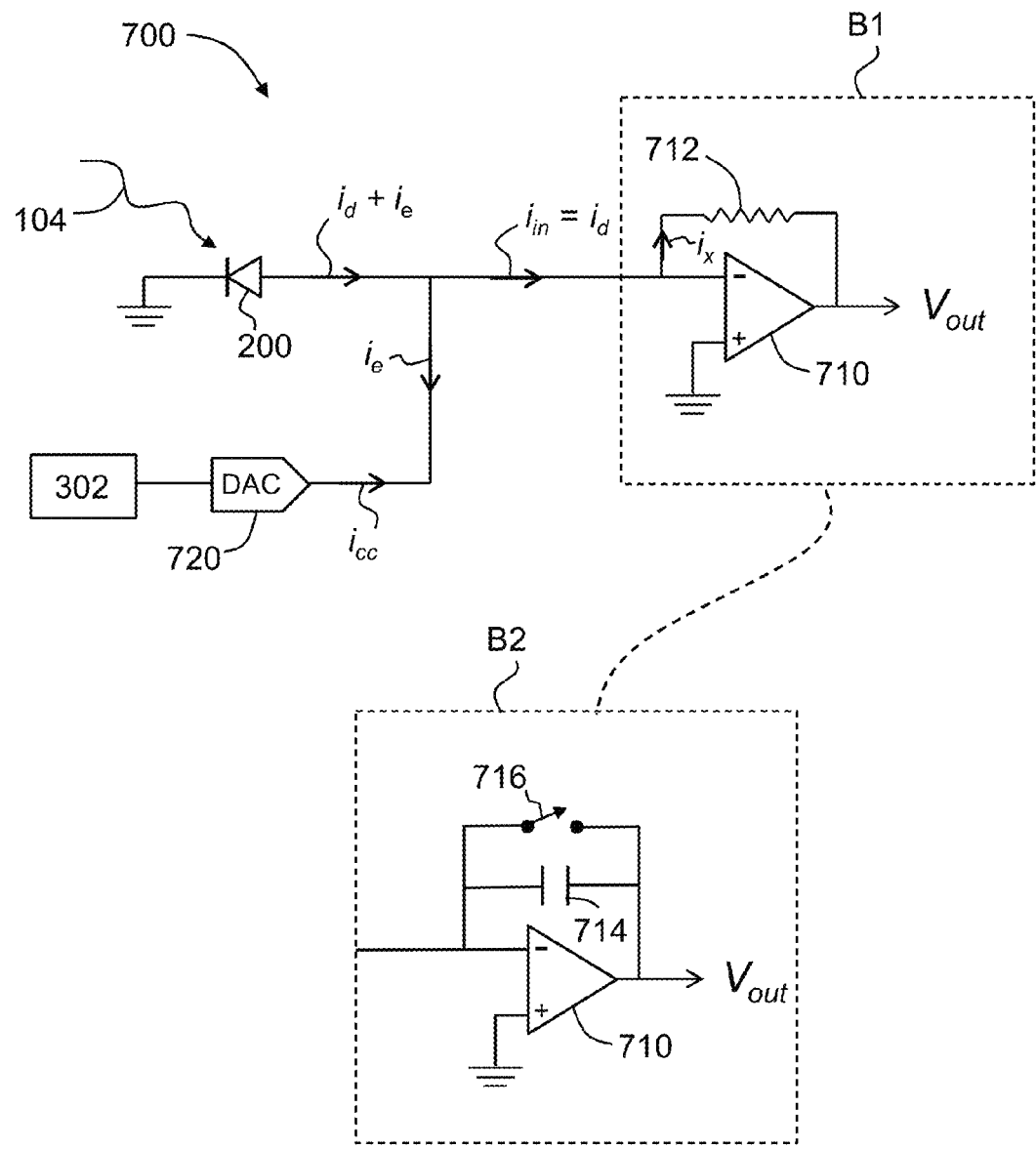
FIG. 20 is a schematic diagram of an example electrical circuit configured to reduce the adverse effects of interfering illumination through the use of current injection.

A transimpedance amplifier configuration for electrical circuit 700 is shown in FIG. 20 in dashed-line box B1 and includes a feedback resistor 712 that defines a feedback resistance (transimpedance value) $R_F$. The transimpedance amplifier configuration adjusts the output voltage $V_{out}$ to make the two input voltages match. Since the positive input is grounded, the circuit forces the negative input to zero volts as well. If an input current $i_n = i_d$ flows in, then the output voltage must pull a current $i_x = i_d$ through the feedback resistor 712, thereby defining $V_{out}$ as $-R_F \cdot i_d$.

A switched integrator configuration for the relevant portion of electrical circuit 700 is shown in box B2, and replaces resistor 712 of Box B1 with a capacitor 714 having a feedback capacitance $C_F$ arranged in parallel with a re-set switch 716. The re-set switch 716 is open from time $t=T_0$ until time $t=T_0+\Delta T$. The photocurrent $i_d$ is converted to voltage $V_{out}$ as defined by:

$$V_{out} = \frac{1}{C_F} \int_{T_0}^{T_0+\Delta T} i_d \, dt$$

In either configuration for electrical circuit 700, amplifier 710 is sensitive to an input current $i_{in}$ and produces an output voltage $V_{out}$ that is proportional to $i_{in}$.

DAC 720 is connected at its input end to processor 302 and its output end to the input current summing node of amplifier 710. The polarity of the current is such that it subtracts from the diode photocurrent. DAC 720 pulls a fixed but programmable amount of current from photodiode 200 and prevents it from overloading amplifier 710. Processor 302 includes software that servos the DAC current to keep amplifier 710 in the linear region. This can be accomplished in several ways. One way involves making periodic measurements of the photocurrent with light-source element 102 turned off (i.e., no light 104 hitting photodetector 200).

The software feedback loop then adjusts the DAC output via feedback signal $V_{out}$ to provide an average measured current of zero. When the zero condition has been achieved, the DAC output will be a compensating current $i_{cc}$ that in one embodiment exactly cancels the interfering photocurrent $i_e$ associated with interfering illumination. The software feedback loop varies the compensating current based on changes in the operating conditions of system 10, e.g., more or less ambient light generating more or less interference light.

In general, an estimate of the total photocurrent from photodiode 200 under any condition can be taken to be the DAC compensating current plus the amplifier photocurrent. By handling the largest portion of the photocurrent using DAC 720 and then measuring only the fluctuation due to touch events TE using amplifier 710, system 10 can tolerate a much larger photocurrent level than is possible with just an amplifier alone. Whether or not DAC 720 is used to precisely cancel the interfering photocurrent $i_e$ by the compensating current $i_{cc}$, the combination of a DAC subtraction and a residual (interfering) photocurrent measurement can extend the range of measureable photocurrent.

Thus, the nulling or compensation (or reduction) of the interfering photocurrent $1_e$ by compensating current $i_{cc}$ can be done by adding a second input to summing node of amplifier 710. A negative current at this node is supplied by DAC 720, which is servo-ed by processor 302 to create a zero photocurrent reading when the light-source element 102 is turned off (i.e., light 104 is not incident upon photodetector 200). This nulling can be accomplished while minimizing both the thermal noise and the shot noise introduced by the canceling current.

Thus, an example method of the disclosure includes generating detector signal SD by making a first photocurrent measurement with one of the light-sensing elements 200 when the light-source elements 102 are turned off to determine a compensating photocurrent. The method then includes making a second photocurrent measurement with the same one of the light-sensing elements 200 with the light-source elements 102 turned on. The method then includes subtracting the first photocurrent measurement from the second photocurrent measurement.

Preventing Amplifier Saturation

In addition to simply eliminating the offset due to an interfering DC illumination, it is useful to prevent saturation of amplifier 710 from such illumination. The overload can be prevented by reducing the gain of the input processing channel, nulling out the extra signal current by a synthetic negative photocurrent, or by changing the integration time of the system.

Gain reduction can be implemented in a transimpedance amplifier by decreasing the transimpedance value $R_F$. However, this has the disadvantage of increasing the system noise. For a switched integrator which normally integrates for a fixed time $\Delta T$, the dV/dt on the integration capacitor 714 rises with the extra photocurrent, so the integrated voltage may exceed the linear range during the fixed integration time. One way to avoid overloading the dynamic range of the integrator is to read and reset the integration capacitor more frequently to avoid saturation. If the integration is broken into N shorter integrations, each of time $\Delta T/N$, then the total photocurrent for time $\Delta T$ can be taken as the sum of the result of each of the N sub-measurements. This technique allows an arbitrary baseline current to be accommodated by adding multiple shorter time measurements together.

Thus, an example method of the disclosure includes generating detector signal SD by making integrated photocurrent measurements for a fixed total time $\Delta T$. The method also includes breaking the fixed total time $\Delta T$ into N intervals to define N sub-measurements that have corresponding time intervals $\Delta T/N$. The method further includes adding together the N sub-measurements to simulate a single integration, and then dynamically choosing N to avoid overloading amplifier 710.

Reduction of Interfering Illumination by Subtraction in Software

If DAC 720 cleanly saturates upon overload, then the output of the DAC can be used to adaptively set the integration time. If a single measurement exceeds the linear range of DAC 720, then the integration time can be reduced to 1/(nT) for successive n, until the measurement falls back into linear range.

To achieve the desired SNR for detector signal SD, n measurements are made and added together to complete one measurement cycle. The filtered DC interference is then digitally subtracted, leaving only the corrected detector signal SD that includes the unavoidable shot noise contribution of the interfering signal.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A method of establishing positions of touch events on a transparent sheet having a perimeter, with light-source elements and light-sensing elements operably disposed adjacent the perimeter, comprising:
    a) using the light-sensing elements, measuring intensity values of light from the light-source elements, the light traveling internally within the transparent sheet over lines-of-sight between the light-source elements and the light-sensing elements, including generating from the light-sensing elements respective detector signals representative of the intensity values;
    b) processing the detector signals with an electrical circuit having an amplifier to determine limiting lines-of-sight for each light-sensing element based on the intensity values as compared to an attenuation threshold, wherein the processing includes: i) making integrated photocurrent measurements for a fixed total time $\Delta T$; ii) breaking the fixed total time $\Delta T$ into N intervals to define N sub-measurements that have corresponding time intervals $\Delta T/N$; iii) adding together the N sub-measurements to simulate a single integration; and iv) dynamically choosing N to avoid overloading the amplifier;
    c) overlapping triangles defined by the limiting lines-of-sight for each light-sensing element to establish one or more polygons; and
    d) determining centers of the one or more polygons to establish the touch event positions.

2. The method of claim 1, wherein each polygon has an associated attenuation based on the measured intensity values, and further comprising:
   eliminating any polygons whose associated attenuation is below the attenuation threshold.

3. The method according to claim 1, further comprising determining the intensity of the touch event based on a comparison of the detector signal strength to a signal threshold.

4. The method according to claim 1, wherein the transparent sheet is substantially transparent to infrared (IR) light, and wherein the light from the light-source elements comprises an IR wavelength.

5. The method according to claim 4, further comprising filtering the IR light with a band-pass filter disposed adjacent the light-sensing elements, the band-pass filter configured to be substantially opaque to visible light and IR light having an IR wavelength different from the IR light emitted by the light-source elements.

6. The method according to claim 1, wherein generating the detector signals includes:
   making a first photocurrent measurement with one of the light-sensing elements when the light-source elements are turned off;
   making a second photocurrent measurement with the same one of the light-sensing elements when the light-source elements are turned on; and
   subtracting the first photocurrent from the second photocurrent.

7. The method according to claim 1, wherein the perimeter includes a plurality of corners, and including arranging the light-sensing elements one adjacent each of the plurality of corners.

8. The method of claim 1, wherein there are n light-sensing elements, and further comprising:
   determining a first set of the triangles for a first one of the light-sensing elements;
   determining a second set of the triangles for a second one of the light-sensing elements;
   determining a first set of the polygons from the first and second sets of triangles;
   determining a third set of the triangles for a third one of the light-sensing elements and establishing intersections of the third set of triangles with the first set of polygons to form a second set of the polygons; and
   repeating the previous step up until the $n^{th}$ light-sensing element to arrive at a final set of polygons used in act d) to establish the touch event positions.

9. The method of claim 1, wherein determining the centers of one or more polygons comprises for each polygon:
   determining attenuation values within the polygon; and
   calculating a center-of-mass of the polygon based on the attenuation values within the polygon and identifying the center-of-mass as the polygon center.

10. The method of claim 1, wherein determining the centers of one or more polygons comprises for each polygon:
    assuming a constant value for the attenuation within the polygon; and
    calculating the geometric center of the polygon as the polygon center.

11. The method of claim 1, wherein the measured intensity values are converted to detector signal strengths by the light-sensing elements, and further comprising:
    establishing a baseline measurement of light traveling over the lines-of-sight;
    defining a threshold detector signal strength based on the baseline measurement; and
    comparing the detector signal strengths associated with the attenuated lines-of-sight to the threshold signal strength to determine whether the touch event occurred.

12. The method of claim 11, further comprising:
    adjusting the baseline measurement based on changes in the detector signal strength; and
    adjusting the threshold signal strength based on the adjusted baseline measurement.

13. A touch-screen system for sensing a location of one or more touch events, comprising:
    a transparent sheet having a perimeter and a top surface where the one or more touch events occur;
    a plurality of light-source elements that emit light and that are operably disposed adjacent the perimeter to couple the light into the transparent sheet to travel therein via total internal reflection;
    a plurality of light-sensing elements operably disposed adjacent the perimeter to detect the light from the light-sensing elements and in response thereto generate detector signals having a signal strength representative of a detected light intensity, wherein the one or more touch events cause attenuation of the light intensity along at least one of the lines-of-sight corresponding to the select light-sensing element;
    an electrical circuit having an amplifier electrically connected to the plurality of light-sensing elements and configured to process the detector signals to: i) make integrated photocurrent measurements for a fixed total time $\Delta T$ ii) break the fixed total time $\Delta T$ into N intervals to define N sub-measurements that have corresponding time intervals $\Delta T/N$; iii) add together the N sub-measurements to simulate a single integration; and iv) dynamically choose N to avoid overloading the amplifier;
    a controller operably coupled to the light-source elements and the light-sensing elements and configured to control the emission of the light from the light-source elements and process the detector signals to:
    I. compare the detector signal strength in each light-sensing element to an attenuation threshold to establish a one or more triangles as defined by limiting ones of the attenuated lines-of-sight for the given light-sensing element;
    II. establish locations of at least one polygon formed by at least one intersection of the one or more triangles; and
    III. calculate a center of the at least one polygon to define locations of corresponding one or more touch events.

14. The system according to claim 13, wherein the controller is further configured to determine the intensity of the touch event based on a comparison of the detector signal strength to a signal threshold.

15. The system according to claim 13, wherein the transparent sheet is substantially transparent to infrared (IR) light, wherein the emitted light from the light sources comprises IR light, and wherein the light-sensing elements are configured to detect the IR light.

16. The system according to claim 13, wherein the perimeter includes a plurality of corners, and wherein the light-sensing elements are disposed one adjacent each of the plurality of corners.

17. The system according to claim 13, further comprising a display unit disposed adjacent the bottom surface of the transparent sheet so that a user views the display unit through the transparent sheet.

18. The system according to claim 13, further comprising band-pass filters disposed one adjacent each of the light-sensing elements, the band-pass filters each configured to be substantially opaque to visible light and IR light having an IR wavelength different from the IR light emitted by the light-source elements.

19. The system according to claim 13, wherein the electrical circuit is configured to provide a compensating current that reduces or eliminates an interfering current that arises due to interfering illumination.

20. The system according to claim 19, wherein the electrical circuit includes a digital-to-analog converter operably connected to a processor that provides a feedback control signal thereto to vary the compensating current.

* * * * *